(12) United States Patent
Kamada et al.

(10) Patent No.: US 6,505,213 B1
(45) Date of Patent: Jan. 7, 2003

(54) FILE MANAGEMENT APPARATUS AND METHOD

(75) Inventors: Jun Kamada, Kanagawa (JP); Etsuo Ono, Kanagawa (JP); Yasutsugu Kuroda, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/411,647

(22) Filed: Oct. 4, 1999

(30) Foreign Application Priority Data

Oct. 20, 1998 (JP) .......................................... 10-297747

(51) Int. Cl.⁷ .......................... G06F 17/30; G06F 12/00
(52) U.S. Cl. ...................... 707/200; 707/204; 711/100; 711/112
(58) Field of Search ................................ 707/200–206, 707/100–102, 1–5, 104; 711/1–6, 100–101, 111–115; 713/152, 165–171, 187; 714/13, 15

(56) References Cited

U.S. PATENT DOCUMENTS 5,832,526 A * 11/1998 Schuyler .................... 707/200
5,963,971 A * 10/1999 Fosler et al. ................ 711/114
6,085,323 A *  7/2000 Shimizu et al. ............. 380/277
6,098,148 A *  8/2000 Carlson ...................... 711/112

FOREIGN PATENT DOCUMENTS

JP            6-187201           7/1994
JP            9-259037          10/1997

* cited by examiner

*Primary Examiner*—Alford W. Kindred
(74) *Attorney, Agent, or Firm*—Staas & Halsey LLP

(57) ABSTRACT

An information storage device in which a plurality of storage media having different accessibility is provided with a unit for controlling the retrieval of a portable storage medium which can be retrieved from an information storage device by selecting, at a request to retrieve the portable storage medium, the storage medium either as storing the body of a file and the data for use in accessing the file or as storing only the body of the file. The information storage device stores in and moves to a storage medium at an appropriate level the data for use in accessing a file depending on the situation.

17 Claims, 28 Drawing Sheets

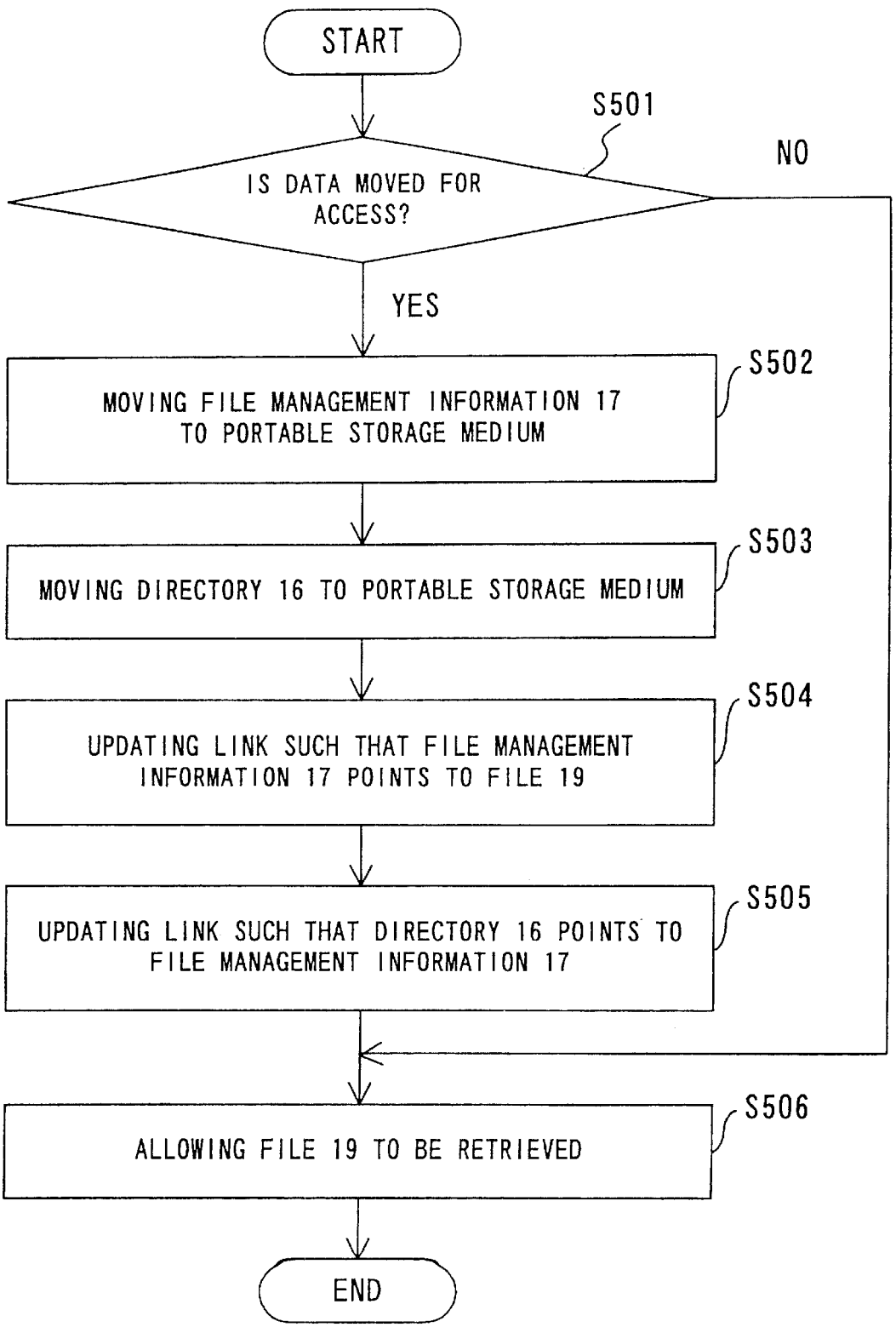
F I G. 5

| CURRENT LOGICAL VOLUME ID |
|---|
| DUPLEXED-TO LOGICAL VOLUME ID |

FIG. 8A

| CURRENT LOGICAL VOLUME ID |
|---|
| DUPLEXED-FROM LOGICAL VOLUME |

FIG. 8B

| LOGICAL VOLUME ID ("Logical Volume #1") |
|---|
| SEQUENCE NUMBER (#10) |
| SECTOR NUMBER (#100) |

FIG. 10

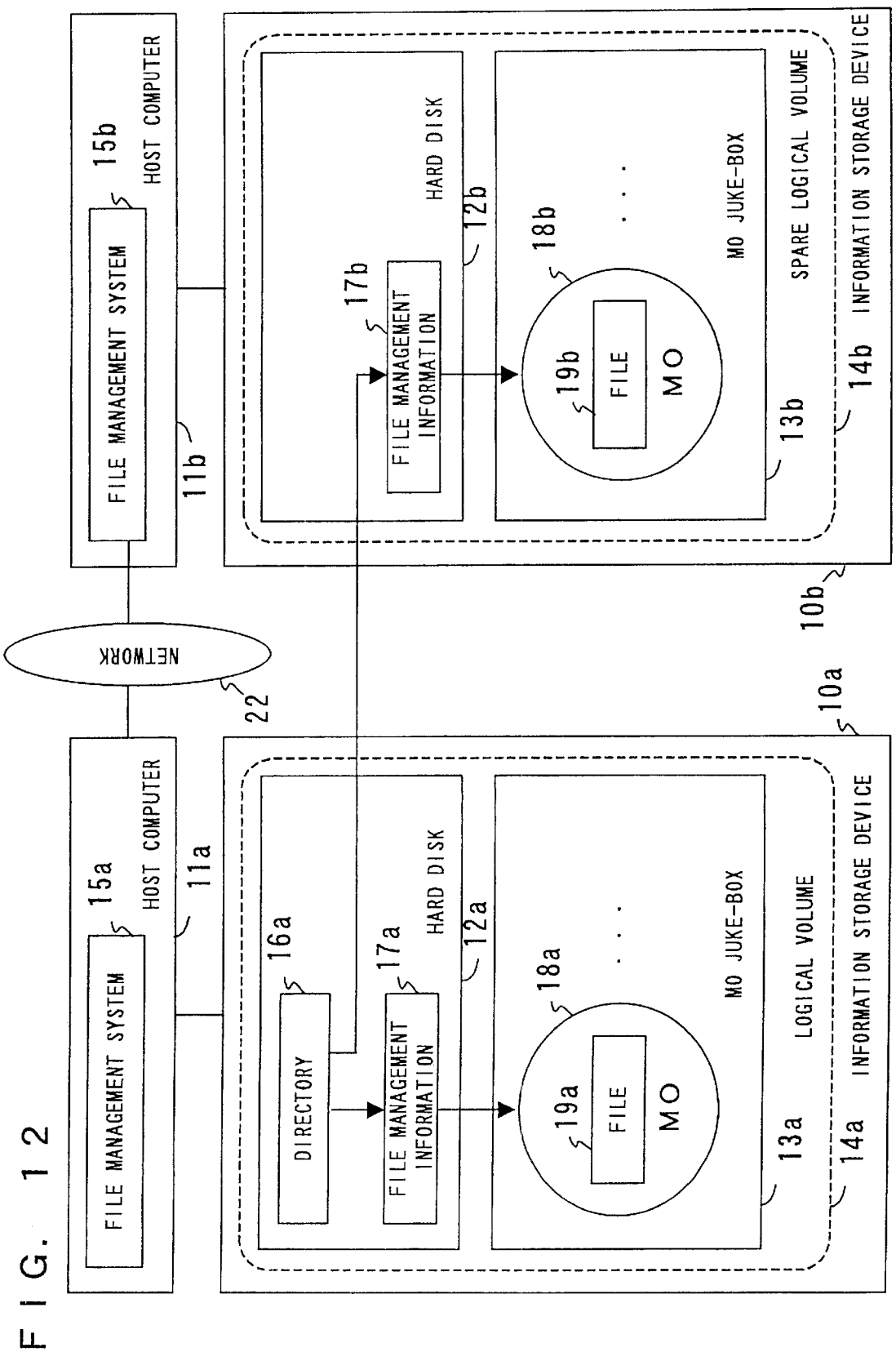
F I G. 12

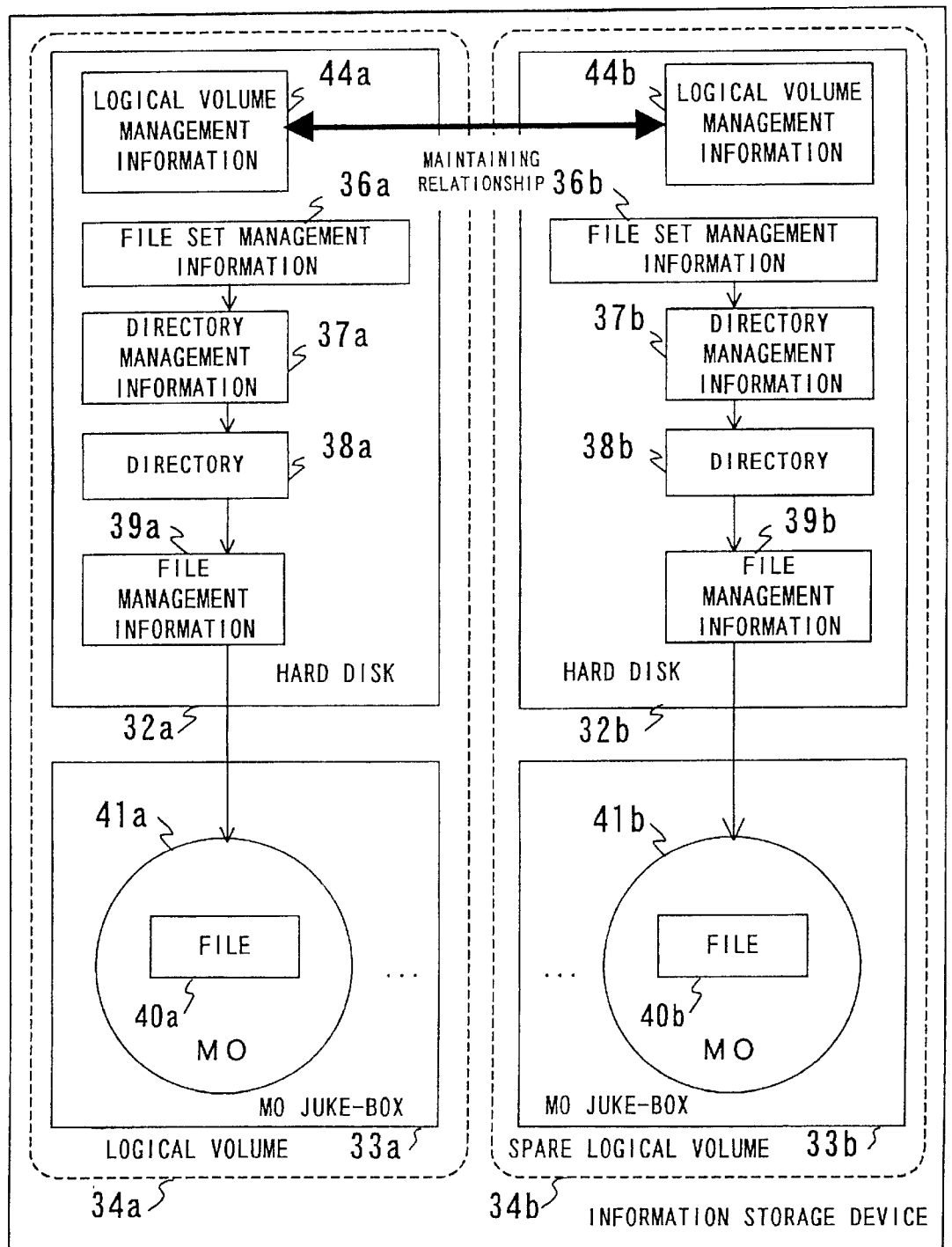
F I G. 2 4

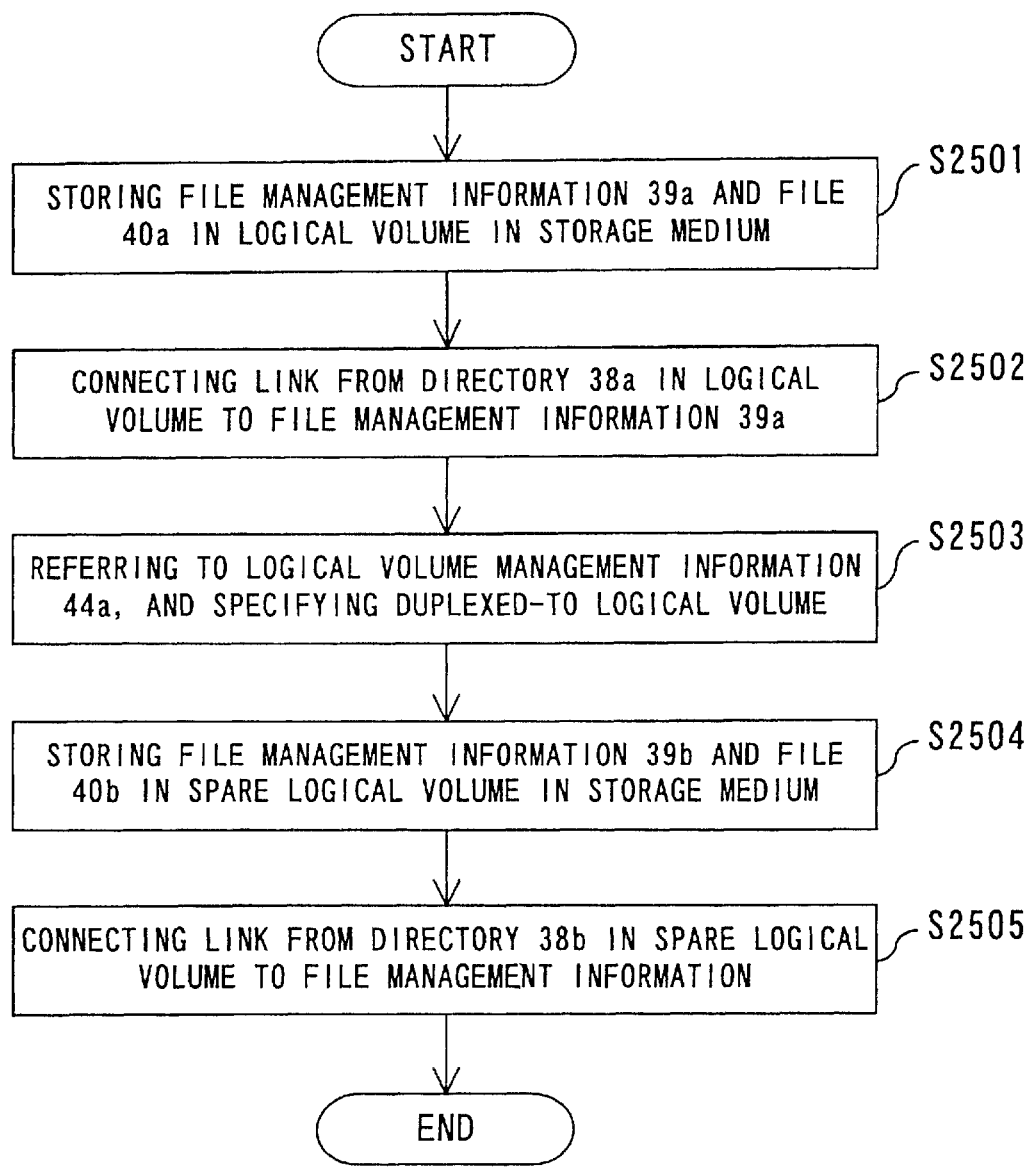
F I G. 2 5

| CURRENT PHYSICAL VOLUME ID |
| --- |
| DUPLEXED-TO PHYSICAL VOLUME ID |

FIG. 27A

| CURRENT PHYSICAL VOLUME ID |
| --- |
| DUPLEXED-FROM PHYSICAL VOLUME |

FIG. 27B

FILE MANAGEMENT APPARATUS AND METHOD

BACKGROUND OF THE INVENTION

1. Field of the Invention

The present invention relates to an information processing apparatus, and more specifically to an apparatus and method for use in an information processing apparatus provided with an information storage device in which a plurality of storage media having different accessibility are hierarchically structured.

2. Description of the Related Art

A hierarchically-structured information storage device including a plurality of storage media having different accessibility is commonly used to efficiently store a large volume of data in an information storage device. A large volume of data can be stored without deterioration in accessibility by hierarchically combining, for example, high-access-speed and small-capacity cache memory, an intermediate hard disk, a low-access-speed and large-capacity magnetic disk, etc.

When the above described hierarchically-structured information storage device is combined with a file management system for controlling access to files containing actual data, there is a request to store, in a storage medium having high accessibility, various attribute information about files, etc. such as information for file access to improve the function of retrieving data in the file. On the other hand, there also is a contradictory request to store the attribute information, etc. in a portable storage medium, that is, in a lower order hierarchical level, to use a portable media such as an MO (magneto-optical disk) independently offline.

On the other hand, in a hierarchically-structured information storage device storing a large volume of data, it is necessary to multiplex data to cover any accidental cases. For example, it is possible to multiplex data by processing the entire hierarchically-structured information storage device logically as a single volume, that is, a logic volume, and providing a spare logical volume. In such a case, there arises a request to store attribute information in a portable storage medium to independently use the portable storage medium offline as described above.

SUMMARY OF THE INVENTION

The present invention has been developed to solve the above described problems, and aims at efficiently accessing data in a hierarchically-structured information storage device by storing or moving information required to access files and attribute information about the files in or to a storage medium at an appropriate hierarchical level depending on the situation. In addition, when a spare logical volume is provided in logical volume units, similar control can be performed to efficiently access data in the spare logical volume.

In an information processing device having an information storage device in which a plurality of storage media having different accessibility are hierarchically combined, the present invention includes: a first control unit for storing data for use in accessing a file in a portable storage medium storing only the body of the file, and then allowing the portable storage medium to be retrieved from the information storage device; a second control unit for allowing a portable storage medium storing only the body of a file without storing data for use in accessing the file to be retrieved from the information storage device; and a file retrieval request unit for allowing either the first control unit or the second control unit to control an external request to retrieve the portable storage medium.

In addition, in an information processing device in which a plurality of storage media having different accessibility form one logical volume, and contain a spare logical volume storing data in the logical volume for use in multiplexing the data in the logical volume, the present invention controls either the first control unit or the second control unit in response to a request to retrieve a portable storage medium in the spare logical volume.

According to the present invention, in an information processing device in which a plurality of storage media having different accessibility are hierarchically structured, an information storage device can be more efficiently utilized by moving and storing file attribute information required to retrieve a file, etc. and the body of the file to and in a storage media at an appropriate hierarchical level depending on the situation. Furthermore, when a spare logical volume is provided in logical volume units of the information storage device, data in the spare logical volume can also be efficiently accessed.

BRIEF DESCRIPTION OF THE DRAWINGS

FIG. 5 is a flowchart of the process performed when a portable storage medium is retrieved from an information processing device according to the first embodiment of the present invention;

FIG. 8A shows duplexed-from logical volume management information, that is, an example of the data structure of the logical volume management information according to the first embodiment of the present invention;

FIG. 8B shows duplexed-to logical volume management information, that is, an example of the data structure of the logical volume management information according to the first embodiment of the present invention;

FIG. 10 shows an example of a pointer to file management information in a spare logical volume;

FIG. 12 shows an example of duplex data in file units through a network;

FIG. 24 shows an example of the configuration of duplex data in logical volume units according to the second embodiment of the present invention;

FIG. 25 is a flowchart of the process of generating a new file shown in FIG. 24;

FIG. 27A shows duplexed-from physical volume management information, that is, an example of the data structure of the physical volume management information shown in FIG. 26;

FIG. 27B shows duplexed-to physical volume management information, that is, an example of the data structure of the physical volume management information shown in FIG. 26.

DESCRIPTION OF THE PREFERRED EMBODIMENTS

The preferred embodiments of the present invention are described below by referring to the attached drawings.

Figure 1:
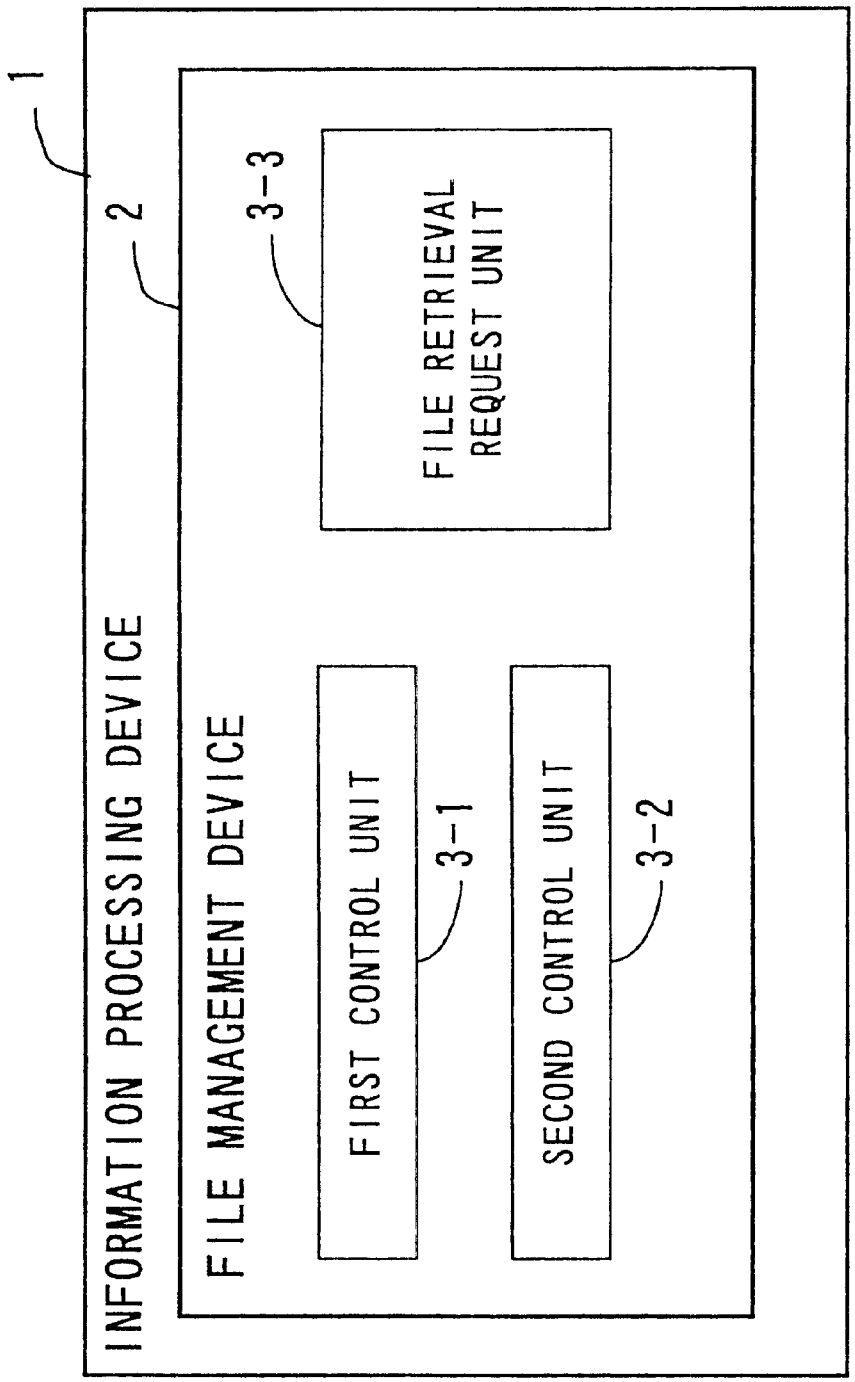
FIG. 1 is a block diagram showing the principle of the present invention.

FIG. 1 is a block diagram of the configuration showing the principle of the information processing device according to the present invention. FIG. 1 is a block diagram of the configuration showing the principle of a file management device 2 in an information processing device 1 provided with information storage devices in which a plurality of storage media having different accessibility are hierarchically combined.

In FIG. 1, the file management device 2 comprises a first control unit 3-1, a second control unit 3-2, and a file retrieval request unit 3-3.

The first control unit 3-1 stores data for use in accessing a file in a portable storage medium storing only the body of the file, and then allows the portable storage medium to be retrieved from the information storage device. The second control unit 3-2 allows a portable storage medium storing only the body of a file without storing data for use in accessing the file to be retrieved from the information storage device. The file retrieval request unit 3-3 allows either the first control unit or the second control unit to control an external request to retrieve the portable storage medium.

Figure 2:
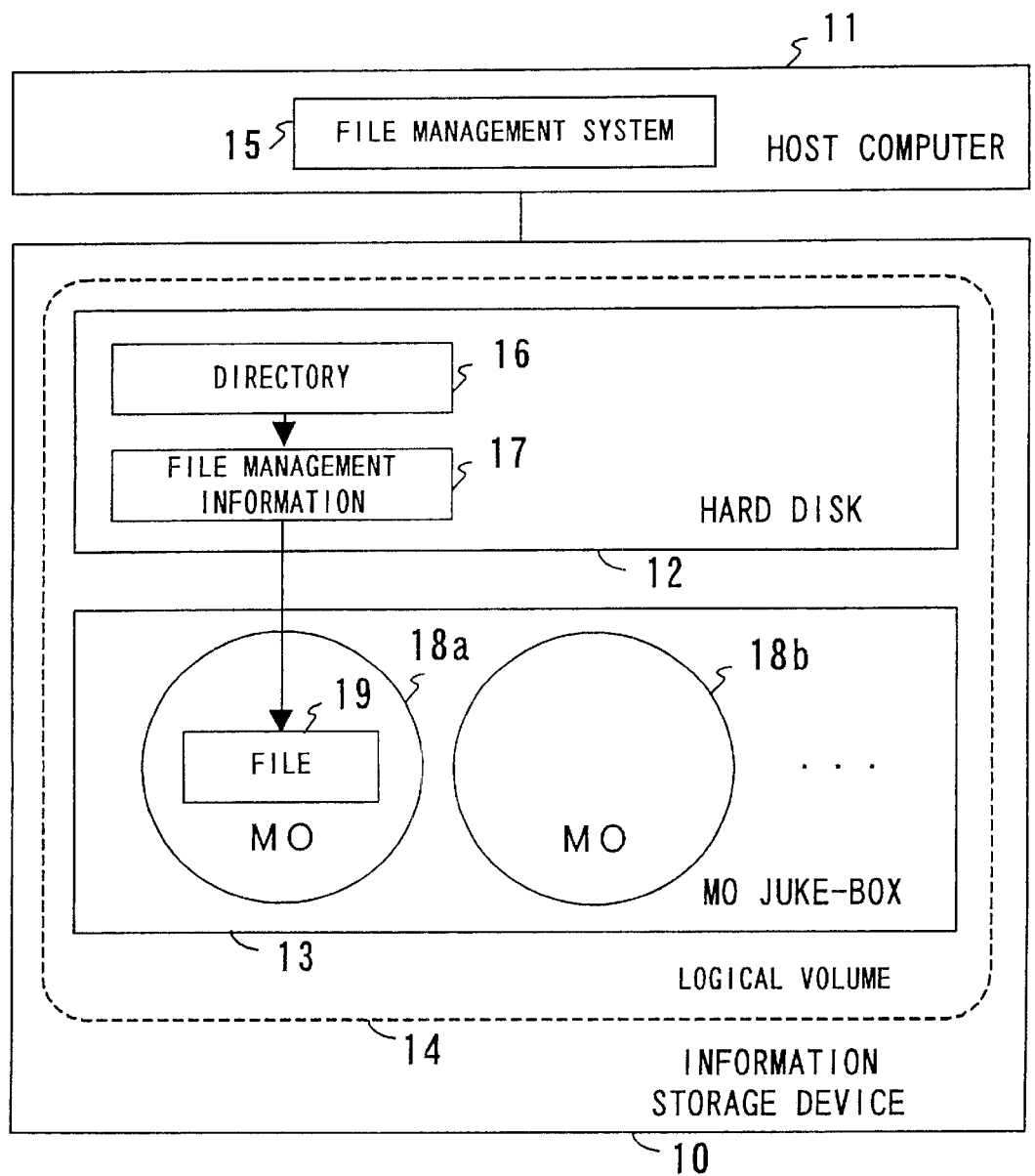
FIG. 2 is a block diagram showing an example of the configuration of the information processing device according to the first embodiment of the present invention.

FIG. 2 shows an example of the configuration of the information processing device according to the first embodiment of the present invention. According to the first embodiment, the file attribute information, etc. such as data for use in accessing files, that is, data other than the body of the files, can be specified by the directory and file management information.

In FIG. 2, the information processing device comprises an information storage device 10 and a host computer 11. The information storage device 10 comprises a hard disk 12 and an MO juke-box 13. These two media form one logical volume 14. On the host computer 11 side, a file management system 15 is included to control the information storage device 10.

According to the first embodiment of the present invention, the hard disk 12 comprises a directory 16 and a file management information 17. The MO juke-box 13 contains a plurality of MOs 18a, 18b, . . . In this example, one file 19 stored in one MO 18a is pointed to by the directory 16 and the file management information 17.

The directory 16 holds, for example, a file name and a logic block number (LBN) as a pointer to the file management information 17. The file management information 17 holds a file generator name, a file generation/amendment/last access date, and a logic block number as a pointer to a file.

According to the first embodiment of the present invention, the directory 16 and the file management information 17 are stored in the hard disk 12 so that the information can be used when a file is retrieved, thereby preventing the deterioration of the performance when the file is retrieved.

Figure 3:
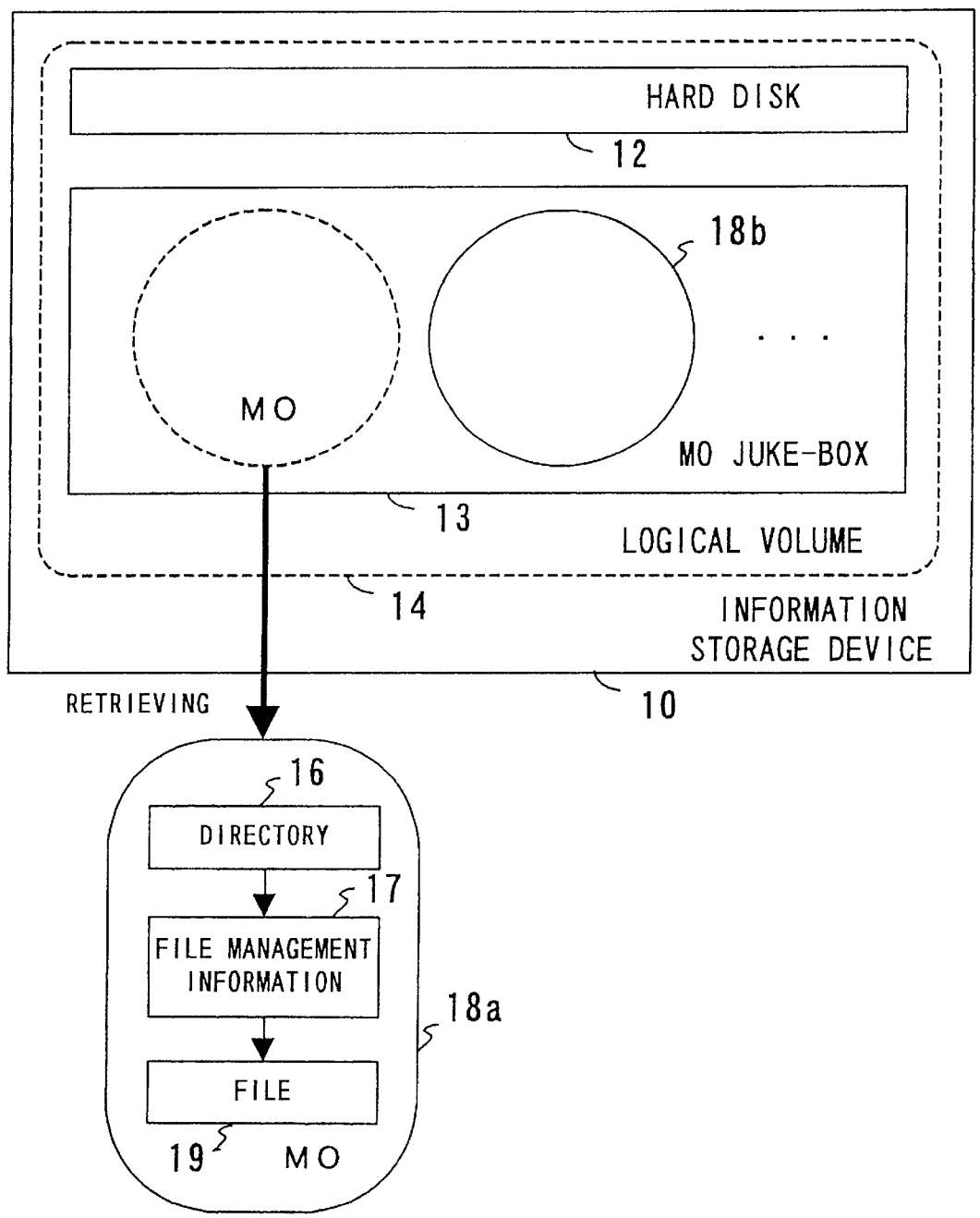
FIG. 3 shows the state in which the MO is retrieved according to the first embodiment of the present invention (when data for use in accessing a file is moved)

FIG. 3 shows the state in which the MO has been retrieved as a file storage medium according to the first embodiment of the present invention. In FIG. 3, the directory 16 and the file management information 17 stored in the hard disk 12 as shown in FIG. 2 are moved to the MO 18a, and the MO storing the file 19 is externally retrieved from the information storage device 10. Since all information about the file is stored in the MO, the contents of the file can be correctly accessed even when the retrieved MO is moved to another computer system in which the file management system of the present invention is implemented.

Figure 4:
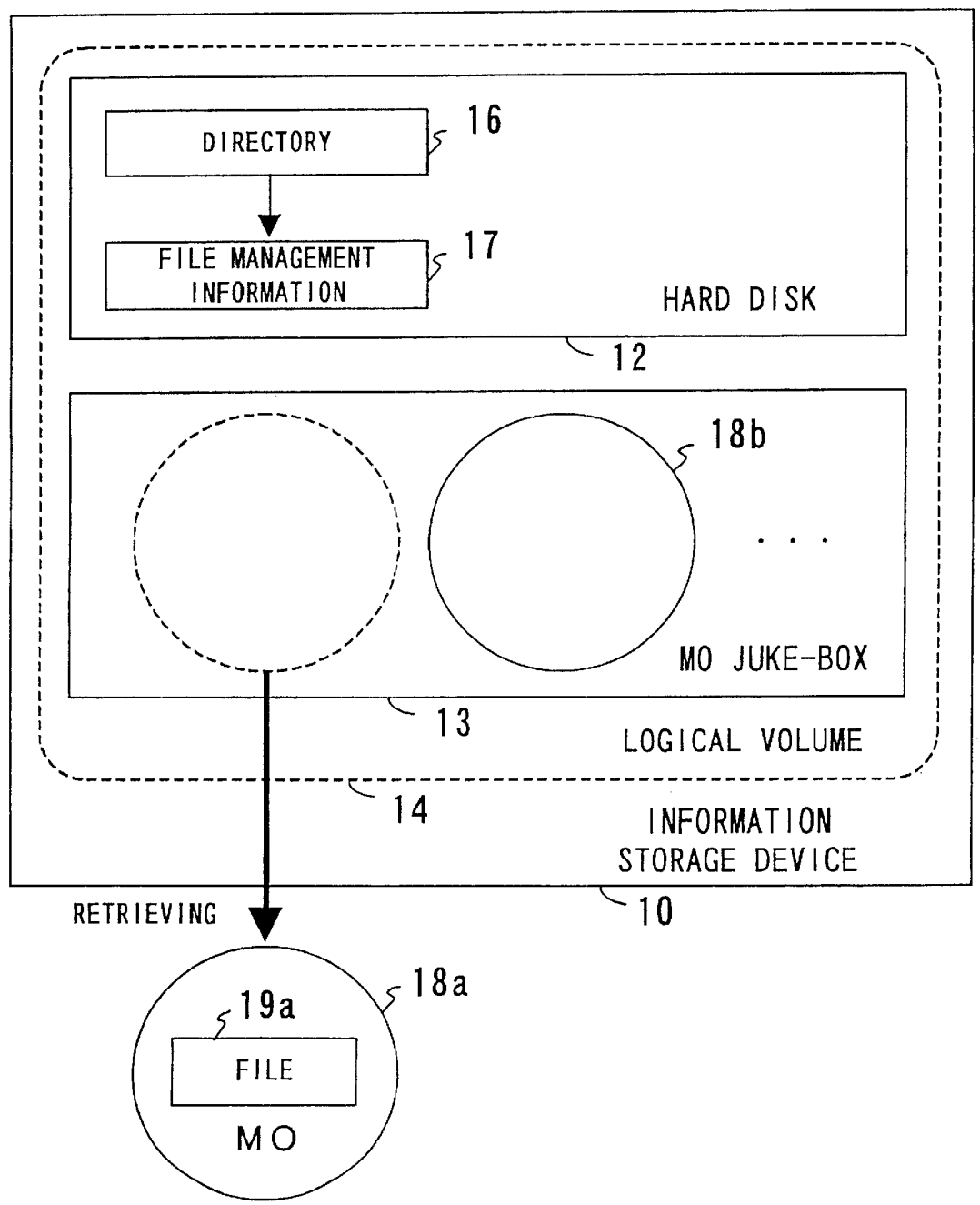
FIG. 4 shows the state in which the MO is retrieved according to the first embodiment of the present invention (when data for use in accessing a file is not moved)

FIG. 4 shows the state in which the MO 18a is retrieved without moving the directory 16 and the file management information 17 to the MO according to the first embodiment of the present invention. FIG. 4 shows a case effective when, since the directory 16 and the file management information 17 are not moved to the MO 18a, but the MO 18a is retrieved from the information storage device 10 with only the body of the file 19 stored, the name of a file, the logic block number as a pointer to a file cannot be obtained, and therefore, the contents of the file cannot be accessed, and the MO is only available by a specific information storage device. That is, from the viewpoint of security, the access to a file storing confidential data can be limited to a specific system only.

FIG. 5 is a flowchart of the process performed when a portable storage medium is retrieved from the information processing device according to the first embodiment of the present invention. As shown in FIG. 5, when the process starts, it is first determined in step S501 whether or not data for use in accessing a file, that is, the directory 16 and the file management information 17 are to be generated in (moved to) a portable storage medium. For example, if the movability is predetermined corresponding to a file, and the data cannot be moved, then the file can be retrieved in step S506, thereby terminating the process. If the data can be moved, the file management information 17 is moved to the portable storage medium in step S502, and then the directory 16 is moved to the portable storage medium in step S503. In step S504, the link is updated such that the file management information 17 can correctly point to a file 19. In step S505, the link is updated such that the directory 16 can correctly point to the file management information 17. In step S506, the file can be retrieved, thereby terminating the process. The process shown in FIG. 5 is performed in response to a request from the user to retrieve a portable storage medium (retrieving operation). After terminating the process shown in FIG. 5, the user can actually retrieve the portable storage medium.

Figure 6:
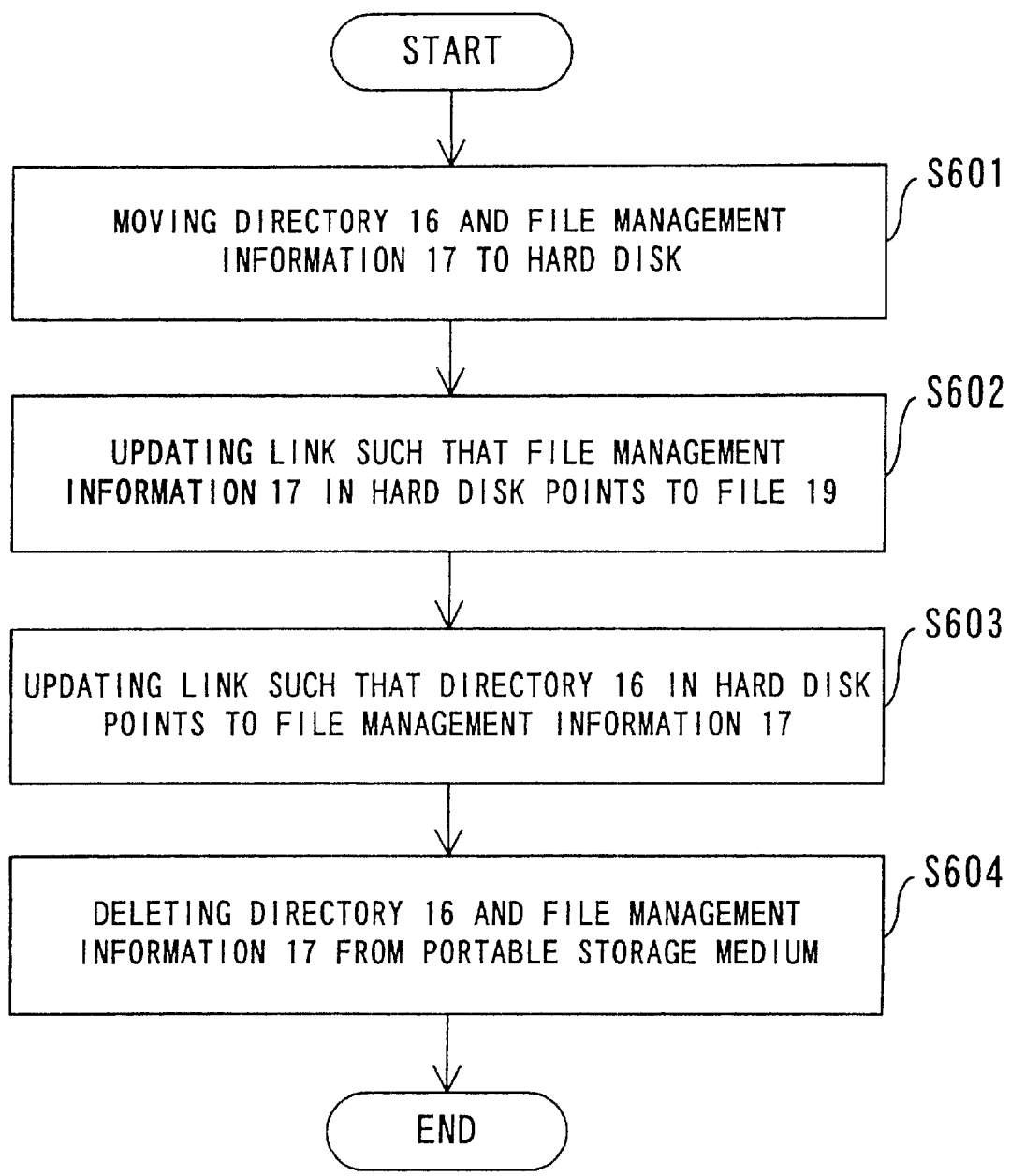
FIG. 6 is a flowchart of the process performed when a portable storage medium is returned to an information processing device according to the first embodiment of the present invention.

FIG. 6 is a flowchart of the process performed when the portable storage medium retrieved according to the first embodiment is returned to the information processing device. As shown in FIG. 6, when the process starts, data for use in accessing a file, that is, the directory 16 and the file management information 17 are moved from a portable storage medium to a hard disk in step S601. In step S602, the link is updated such that the file management information 17 in the hard disk can point to the file 19. In step S603, the link is updated such that the directory 16 in the hard disk can point to the file management information 17. Then, in step S604, the directory 16 and the file management information 17 are deleted from the portable storage medium, thereby terminating the process.

Figure 7:
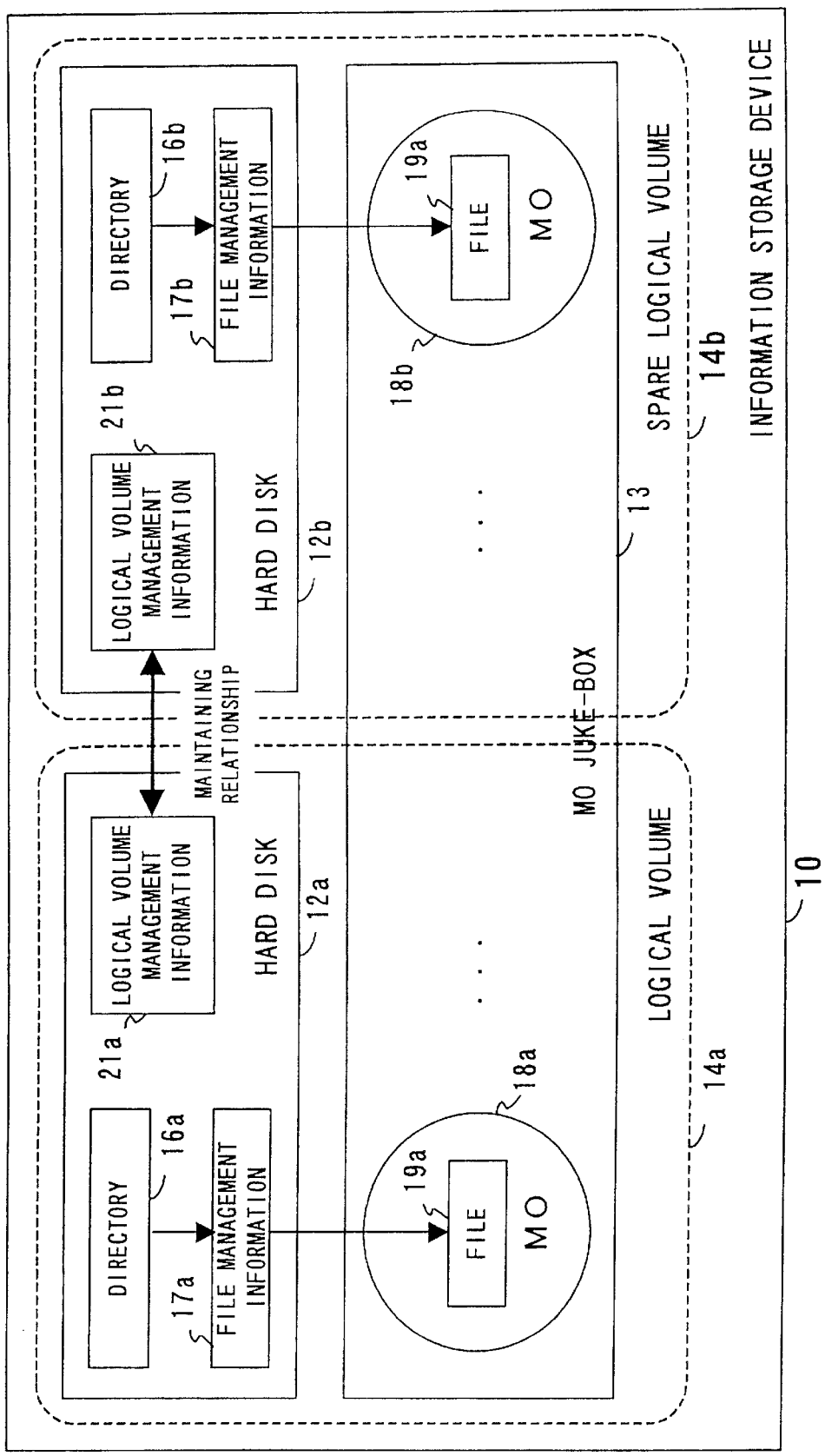
FIG. 7 shows an example of the configuration of duplex data in logical volume units according to the first embodiment of the present invention.

FIG. 7 shows an example of the configuration of duplex data stored in logical volume units according to the first embodiment of the present invention. Normally, in the information storage device storing a large volume of data, stored data is duplexed to correspond to the loss of data in an accidental event. In FIG. 7, a spare logical volume 14b is provided corresponding to a logical volume 14a, and a hard disk 12b is added for the spare logical volume. The MO juke-box 13 is commonly used for two logical volumes.

In FIG. 7, the relationship between two logical volume management information 21a and 21b respectively corresponding to the logical volume 14a and the spare logical volume 14b is held. FIGS. 8A and 8B show examples of the data structure of the logical volume management information.

FIG. 8A shows the contents of the duplexed-from logical volume management information, that is, the logical volume management information 21a in the logical volume 14a. The contents include a current logical volume ID and a duplexed-to logical volume ID, that is, the logical volume identifier of the spare logical volume 14b. In addition, FIG. 8B shows the contents of the duplex-to logical volume management information, that is, the logical volume management information 21b. The contents include a current logical volume ID and a duplex-from logical volume ID, that is, the logical volume identifier of the logical volume 14a.

Figure 9:
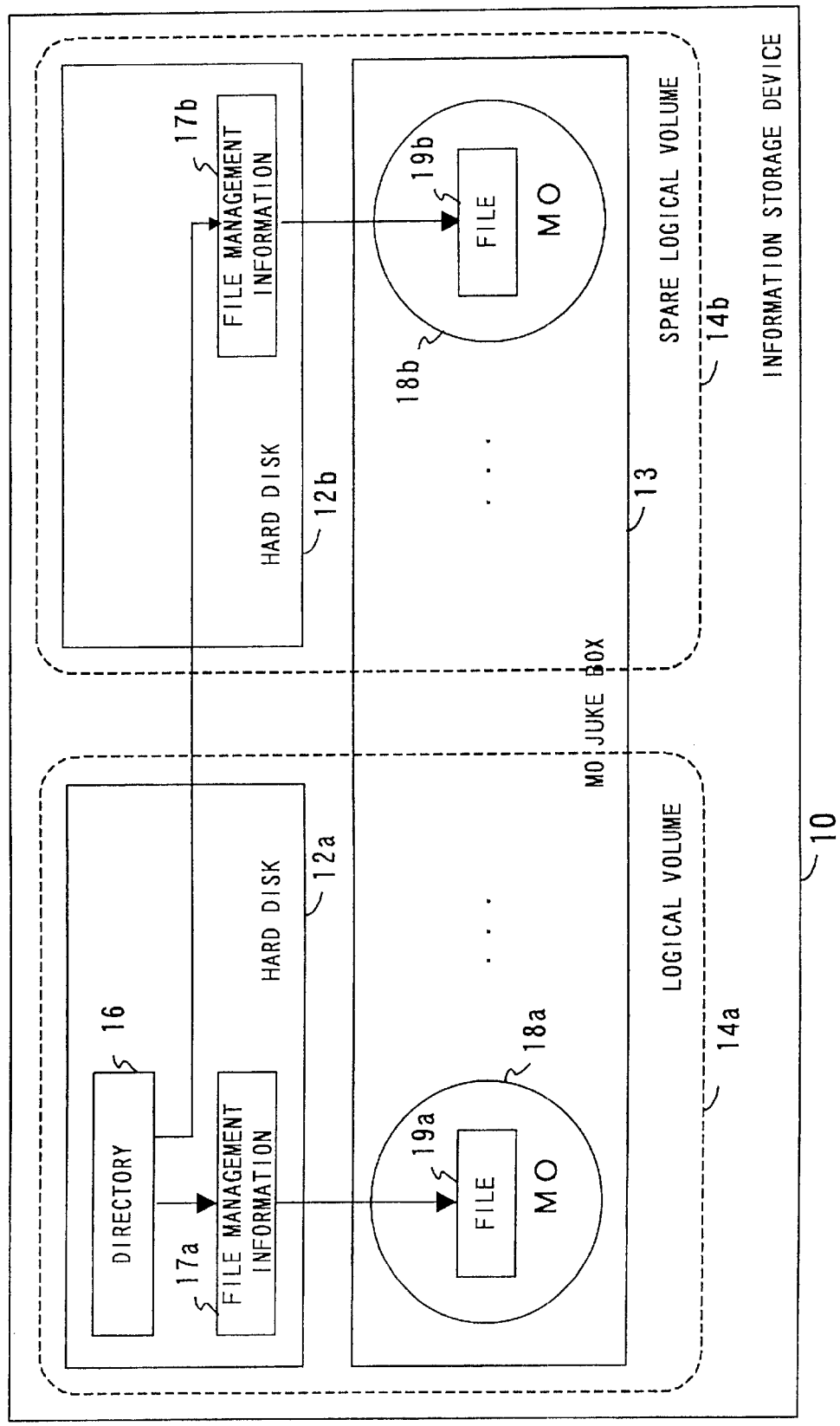
FIG. 9 shows an example of the configuration of duplex data in file units according to the first embodiment of the present invention.

FIG. 9 shows an example of the configuration of duplex data in file units according to the first embodiment of the present invention. As shown in FIG. 9, a link is established from the directory 16 stored in a hard disk 12a in the logical volume 14a to a file management information 17b, stored in the hard disk 12b in the spare logical volume 14b, pointing to a file 19b in the spare logical volume.

In FIG. 9, the directory 16 contains the name of a file, a pointer to the file management information 17a in the logical volume 14a, and the file management information 17b in the spare logical volume 14b.

FIG. 10 shows an example of a pointer to the file management information in the spare logical volume. A pointer contains a logical volume ID, a sequence number, and a sector number. A logical volume ID is an identifier assigned to each of the logical volumes including spare logical volumes. A sequence number is a unique value assigned to each physical medium belonging to a logical volume. A sector number is a number assigned to a sector as the smallest storage unit in each physical medium. In FIG. 10, a logical volume ID is a logical volume #1, a sequence number is #10, and a sector number is #100.

A sequence number corresponds to the number of physical volumes in a logical volume. For example, when a logical volume contains a hard disk and ten MOs, the numbers #1 through #11 are assigned to the hard disk and each of the MOs.

Figure 11:
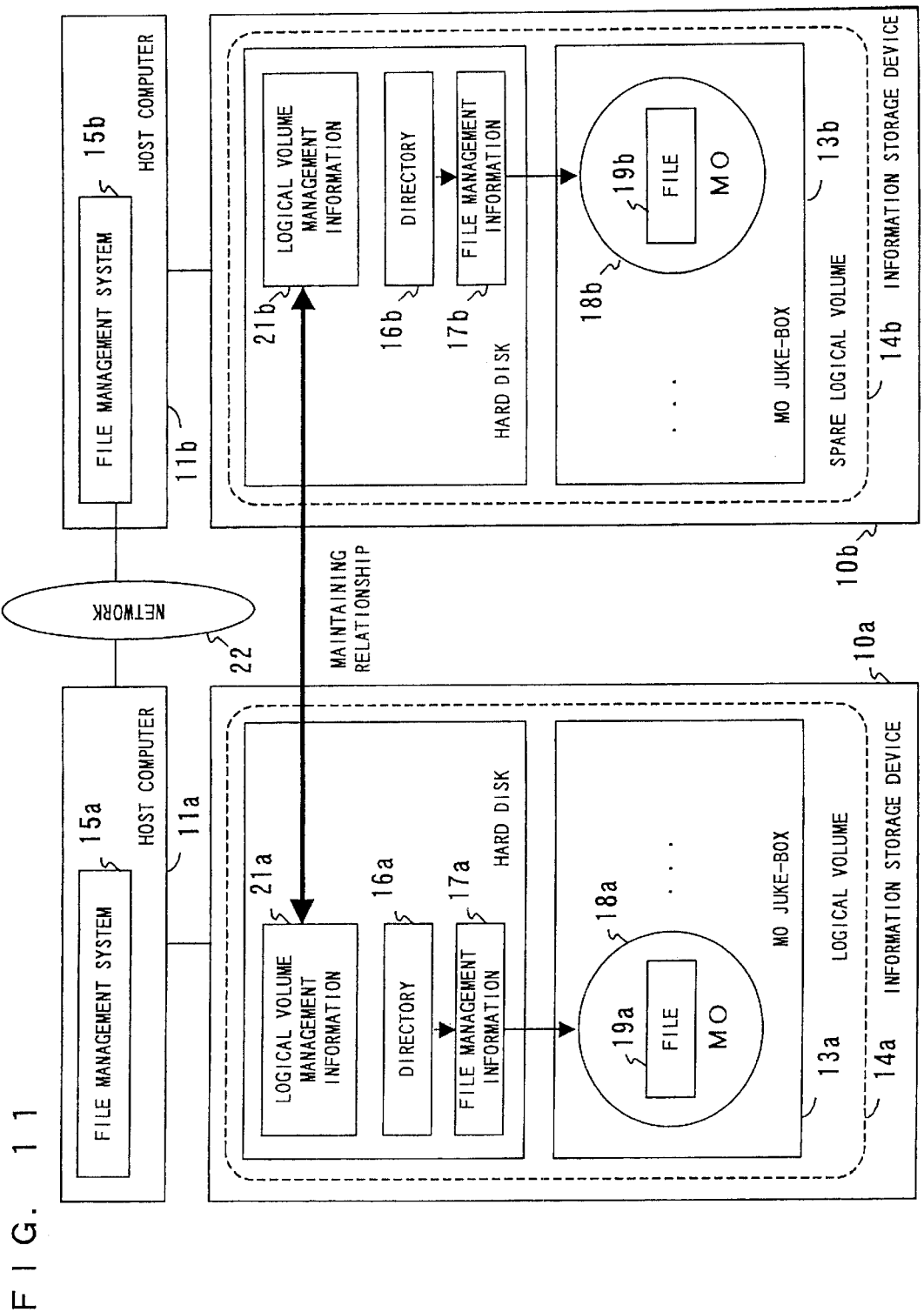
FIG. 11 shows an example of the configuration of duplex data through a network according to the first embodiment of the present invention.

FIG. 11 shows an example of the configuration of duplex data through the network according to the first embodiment of the present invention. In FIG. 11, host computers 11a and 11b respectively having the file management systems 15a and 15b are connected through a network 22. The file management systems 15a and 15b respectively control information storage devices 10a and 10b. The relationship between the logical volume 14a and the spare logical volume 14b is similar to the relationship shown in FIG. 7, but the MO juke-boxes are independently provided for the two information storage devices 10a and 10b connected through the network 22.

FIG. 12 shows an example of the configuration of the duplex data processed in file units through a network unlike the case shown in FIG. 11. The example shown in FIG. 12 is different from that shown in FIG. 11 in that a link is established from the directory 16 in the logical volume 14a to the file management information 17b in the spare logical volume 14b, and that logical volume management information is not stored in the two logical volumes.

Figure 13:
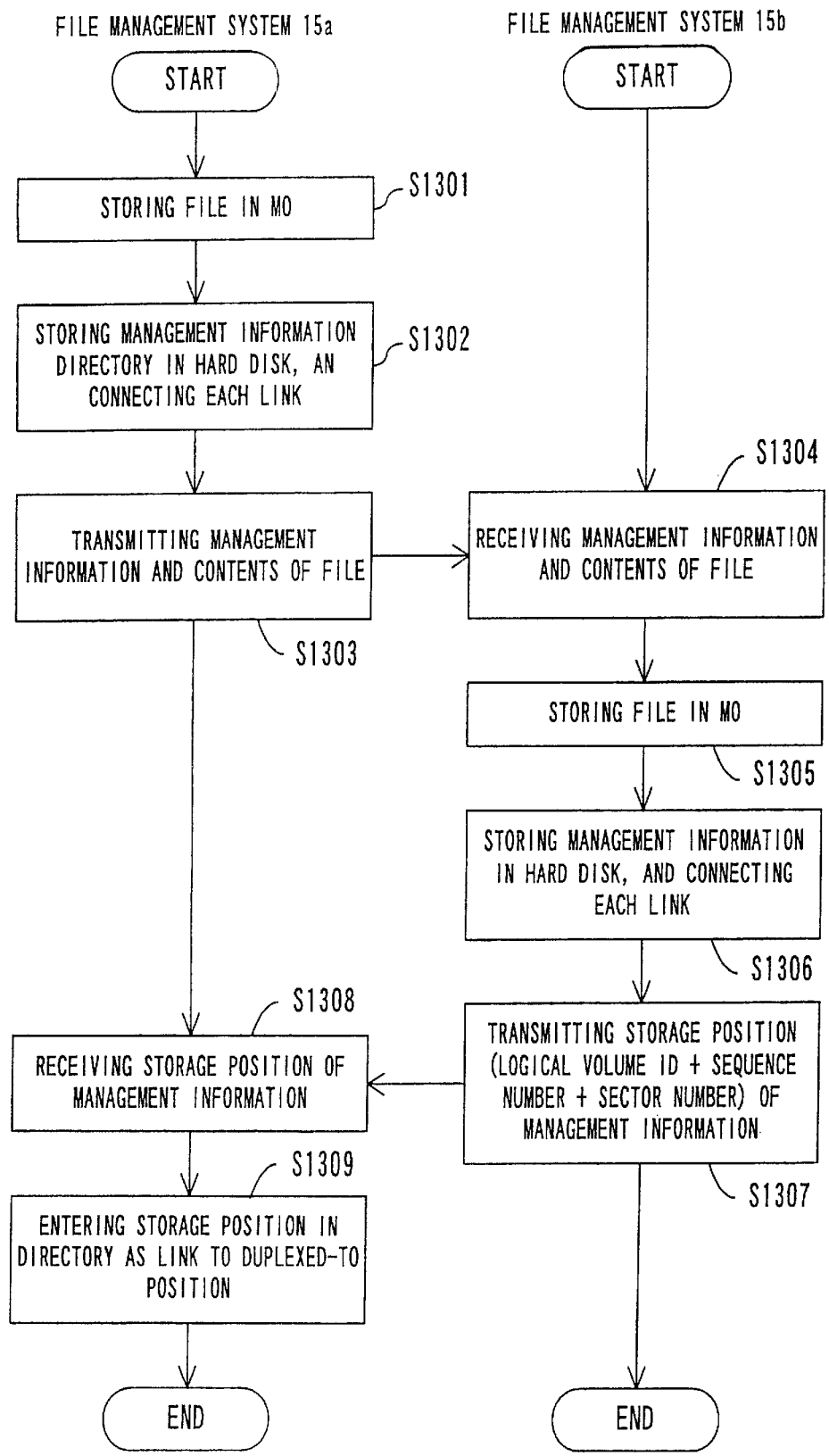
FIG. 13 is a flowchart of the process performed when a file is generated as shown in FIG. 12.

FIG. 13 is a flowchart of the process performed when a file is generated as shown in FIG. 12. As shown in FIG. 12, when the process is started by the file management system 15a of the logical volume 14a, a file 19a is stored in the MO 18a in step S1301. In step S1302, the file management information 17a and the directory 16 are stored in the hard disk 12a, and the link from the directory 16 to the file management information 17a and the link from the file management information 17a to the file 19a are connected. In step S1303, the file management information and the contents of the file are transmitted to the host computer 11b through the network 22.

The file management system 15b of the host computer 11b has already started its process, receives the file management information and the contents of the file in step S1304, and stores the file 19b in the MO 18b in step S1305. In step S1306, the file management information 17b is stored in the hard disk 12b, and the link is connected from the management information to the file 19b. In step S1307, the storage position of the file management information 17b, that is, the logical volume ID+sequence number+sector number, is transmitted to the host computer 11a through the network 22.

On the host computer 11a side, the file management system 15a receives the storage position of the management information in step S1308. In step S1309, the link to the storage position of the file management information 17b in the spare logical volume 14b is entered as a link to a data duplexed-to position in the directory 16, thereby terminating the process.

Figure 14:
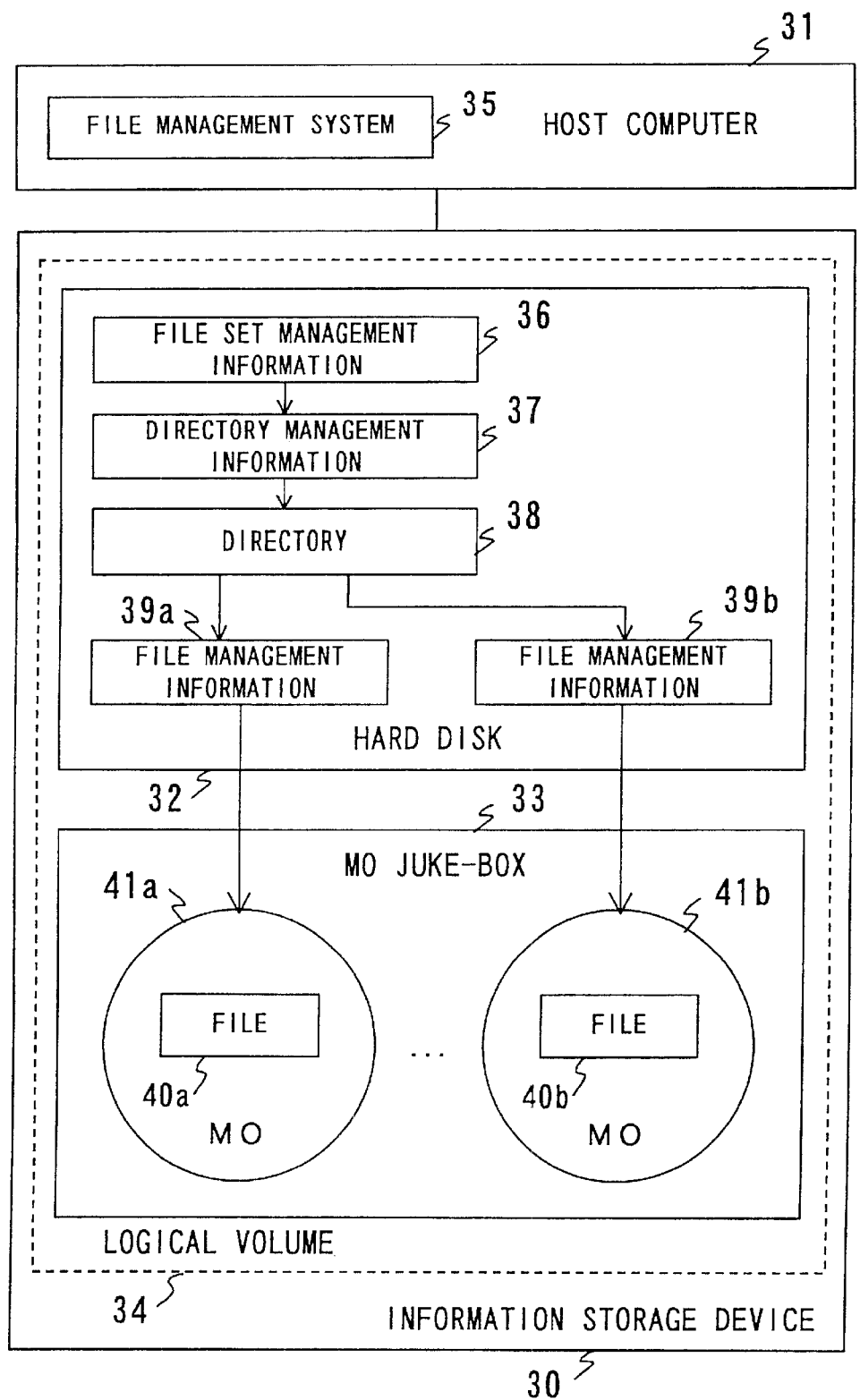
FIG. 14 is a block diagram showing an example of the configuration of the information processing device according to the second embodiment of the present invention.

FIG. 14 shows an example of the configuration of the information processing device according to the second embodiment of the present invention. According to the second embodiment, file set management information and directory management information are provided in addition to the directory and file management information according to the first embodiment as the information for use in accessing a file other than the file body.

In FIG. 14, a hard disk 32 forming part of a logical volume 34 comprises a file set management information 36, a directory management information 37, a directory 38, and file management information 39a and 39b. The above described information is described later in detail.

An MO juke-box 33 stores files 40a and 40b respectively pointed to by the file management information 39a and 39b. In this example, these files are stored in MOs 41a and 41b respectively, but it is obvious that these two files can be stored in one MO. As described later, it is also possible to store plural pieces of the directory management information 37 and a plurality of directories 38 in the hard disk 32.

Figure 15:
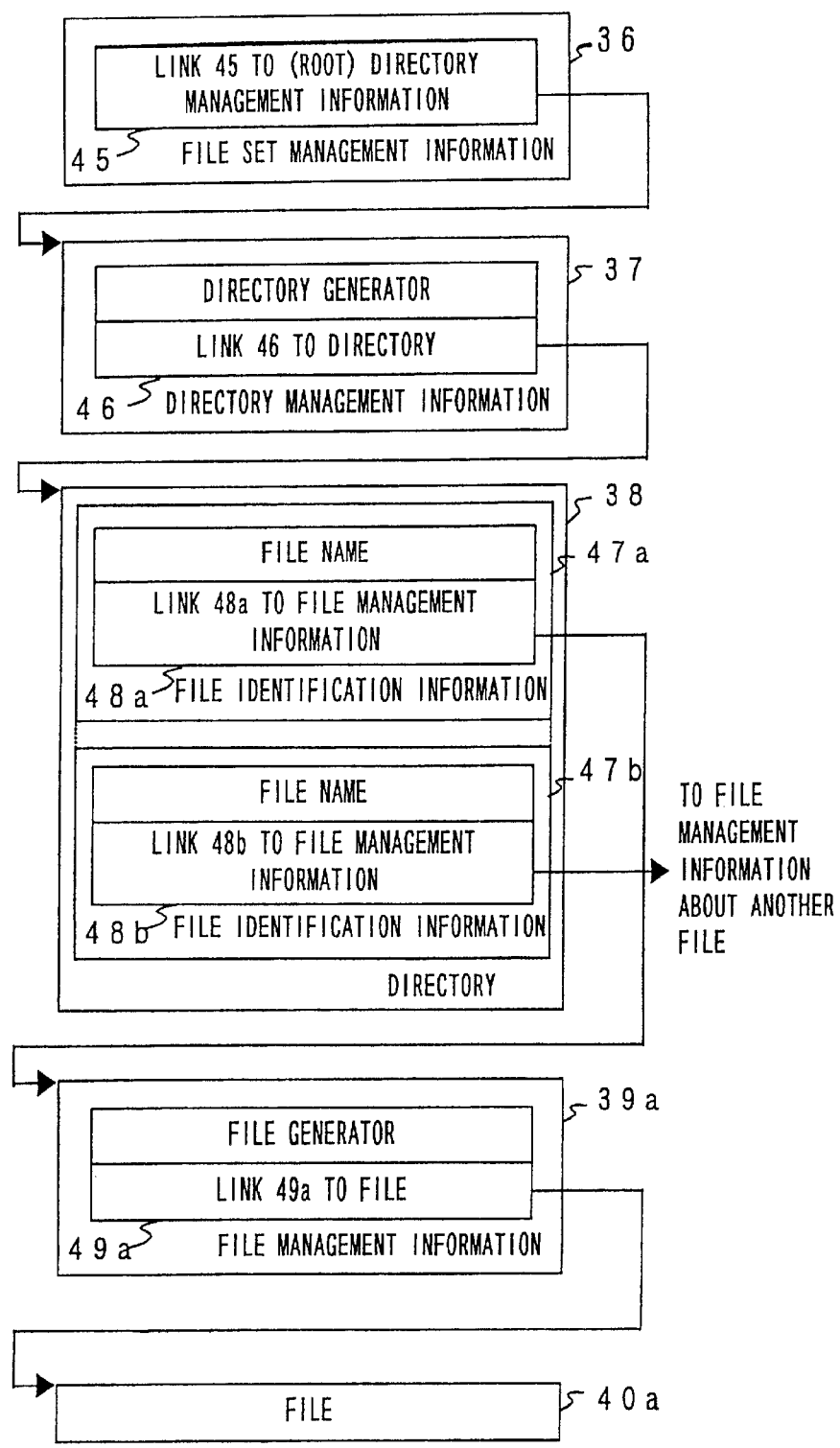
FIG. 15 shows an example of the data structure of a file in a storage medium according to the second embodiment of the present invention.

FIG. 15 shows an example of the data structure of a file such as a file body and data required to access the file body stored in, for example, a hard disk and an MO. As described above by referring to FIG. 14, the directory management information 37, the directory 38, the file management information 39a, and the file 40a are pointed to in this order under the file set management information 36. In the file set management information 36, a link 45 to the (root) directory management information is stored. The directory 38 can be pointed to through the link. The root directory is described later.

The directory 38 stores a link 46 to a directory in addition to data such as the name of a user who generates a directory. The directory 38 can be pointed to by the link.

The directory 38 stores file identification information 47a, 47b, . . . corresponding to respective files stored therein. Each piece of file identification information stores in addition to the data such as the name of a file a link to file management information corresponding to the file identification information, and corresponding file management information 39a is pointed to by the link.

The file management information 39a stores a link 49a to a file in addition to the data such as the name of a file generator, the generation date and time, etc., and a corresponding file 40a is pointed to by the link.

In FIG. 15, the file set management information is stored in each physical medium, and points to the root directory (top directory) management information in the medium. The directory 38 holds file identification information about all files contained in the directory, and the number of pieces of information matches the number of files.

Figure 16:
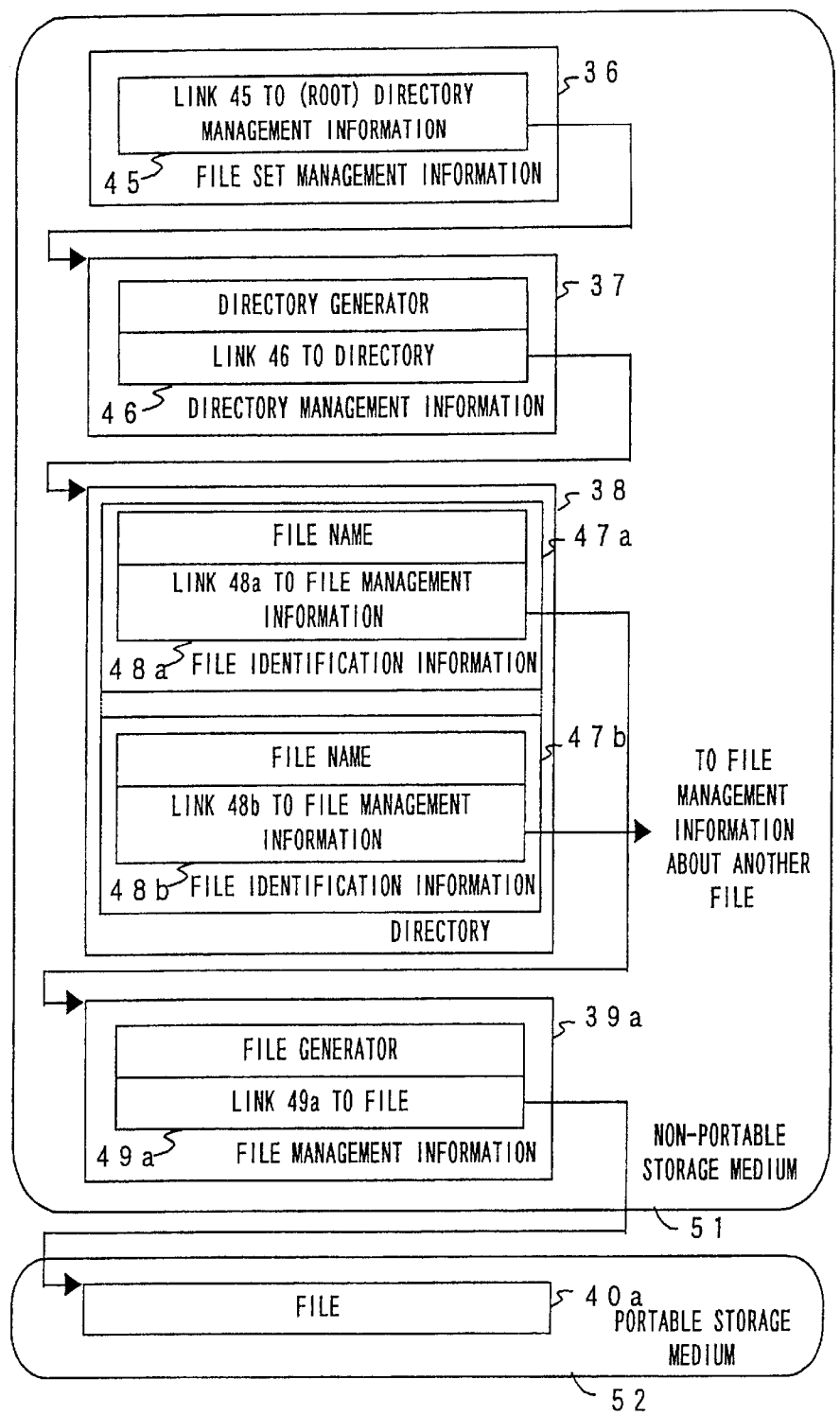
FIG. 16 shows the state of the data structure shown in FIG. 15 stored in the information storage device shown in FIG. 14 according to the second embodiment of the present invention.

FIG. 16 shows the state in which the data structure shown in FIG. 15 is stored in an information storage device 30 shown in FIG. 14. In FIG. 16, the hard disk 32 shown in FIG. 14 is shown as a non-portable storage medium 51, and the MOs 41a, 41b, . . . in the MO juke-box 33 are shown as portable storage media 52. For example, in the state in which an MO is inserted in the information storage device 30, the file set management information 36, the directory management information 37, the directory 38, and the file management information 39a are stored in a non-portable media, for example, in the hard disk 32. Only the file 41a is stored in the portable storage medium 52, for example, in the MO 41a.

Figure 17:
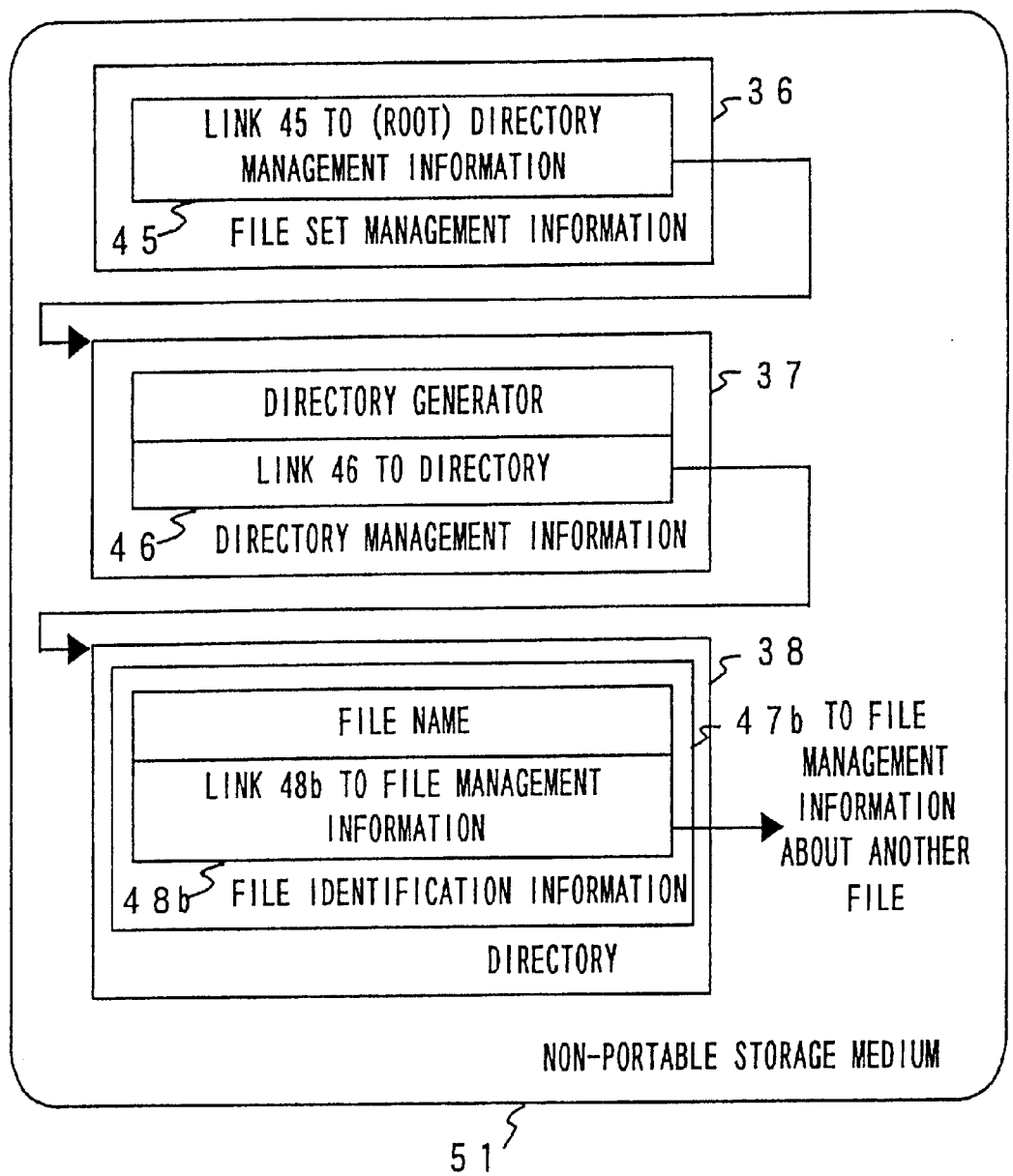
FIG. 17 shows the state in which data is stored in a non-portable medium after a portable storage medium has been retrieved from the information storage device according to the second embodiment of the present invention.
Figure 18:
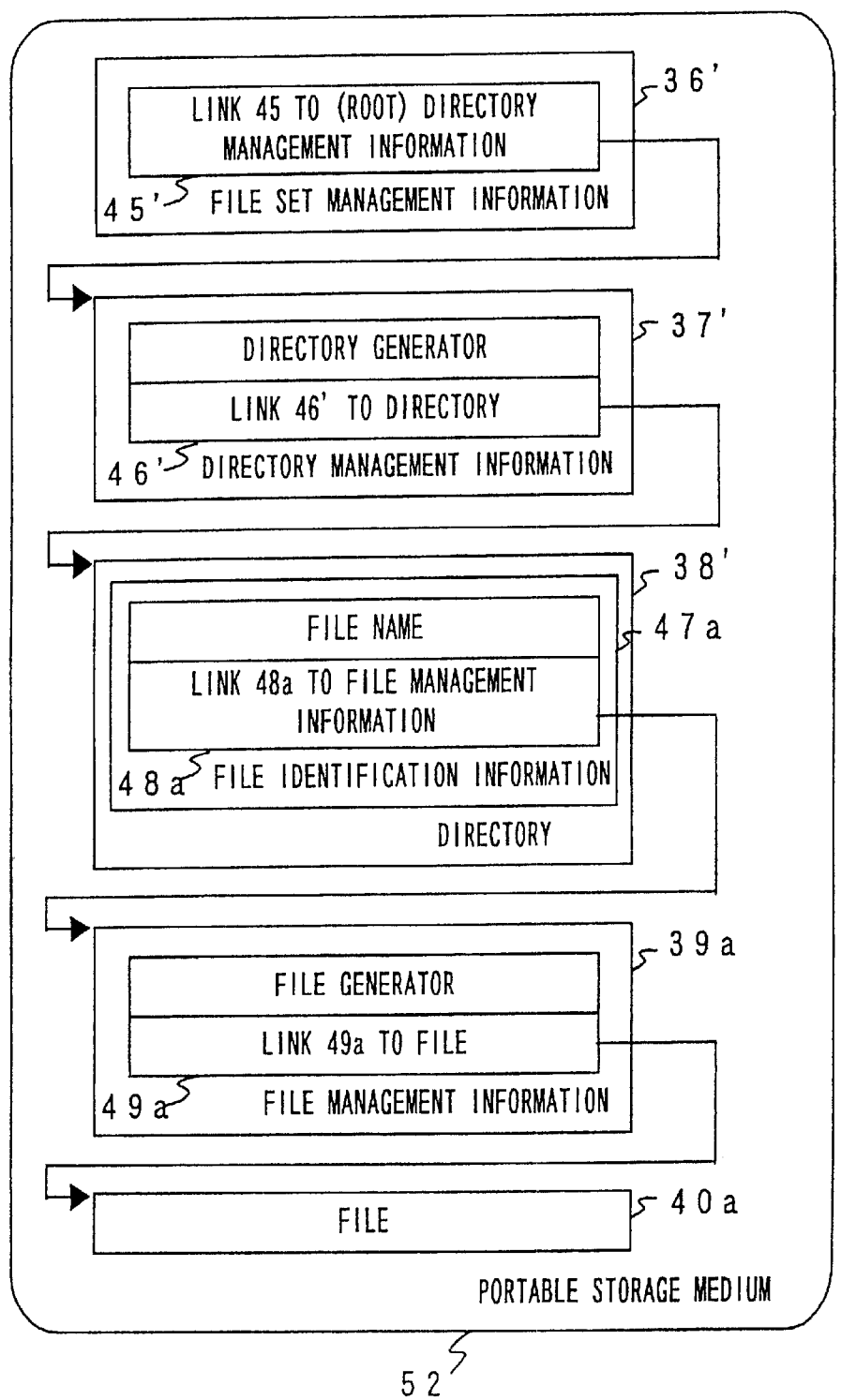
FIG. 18 shows the state in which data is stored in a portable medium after a portable storage medium has been retrieved from the information storage device according to the second embodiment of the present invention.

FIG. 17 shows the state of the storage of data in a non-portable storage media after, for example, an MO has been retrieved from the information storage device. FIG. 18 shows the state of the storage of data in a portable storage medium. In FIG. 17, as compared with FIG. 16, the file management information 39a and the file identification information 47a corresponding to the file 40a in the directory 38 have been moved to the 52, and are not currently stored in the non-portable storage medium 51.

In FIG. 18, a file set management information 36', a directory management information 37' and directory 38' are newly added. The file set management information 36' stores a link 45' to the directory management information 37'. The directory management information 37' stores a link 46'to the directory 38'in addition to the data such as the name of a directory generator. The directory 38'stores the file identification information 47a moved from the non-portable storage medium 51. Then, the file management information 39a pointed to by the link 48a to the file management information in the file identification information 47a is moved from the non-portable storage medium 51, and is stored such that the link 49a can be established to the file 40a.

Figure 19:
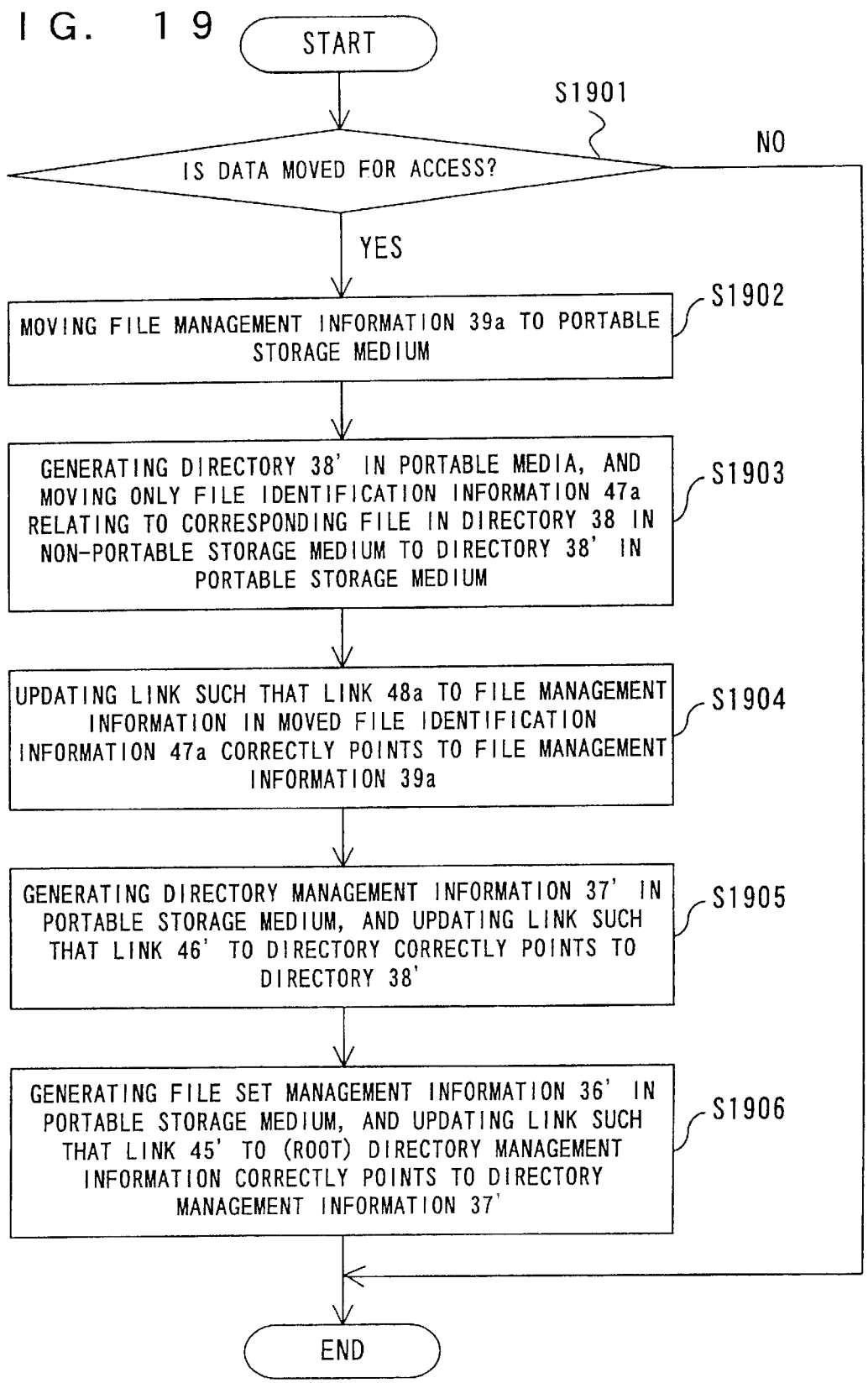
FIG. 19 is a flowchart of the process performed when a portable storage medium is retrieved from the information processing device according to the second embodiment of the present invention.

FIG. 19 is a flowchart of the process performed when a portable storage medium is retrieved from the information processing device according to the second embodiment of the present invention. As shown in FIG. 19, when the process starts, it is first determined in step S1901 whether or not data for use in accessing a file, that is, the data from the file set management information to the file management information are to be generated in (moved to) a portable storage medium. For example, if the movability is predetermined corresponding to a file, and the data cannot be moved, then the process immediate terminates. If the data can be moved, the file management information 39a is moved to the portable storage medium in step S1902, and the directory 38' is generated in the portable storage medium in step S1903. In the data stored in the directory 38 in the non-portable storage medium, only the file identification information 47a are moved to the directory 38'.

In step S1904, a link is updated such that the link 48a to the file management information in the moved file identification information 47a can correctly point to the file management information 39a. Then, in step S1905, the directory management information 37' is generated in a portable storage medium, and a link is updated such that the link 46' to the directory in the directory management information 37' can correctly point to the directory 38'. In step S1906, the file set management information 36' is generated in a portable storage medium, and a link is updated such that the link 45' to directory management information can correctly point to the directory management information 37', thereby terminating the process.

The process shown in FIG. 19 corresponds to, for example, a user's portable storage medium retrieval request (retrieving operation), and the user actually can retrieve a portable storage medium after the termination of the process shown in FIG. 19. In FIG. 19, as in FIG. 5, the step of 'allowing a file to be retrieved' is required before terminating the process. However, since this step is normally performed, it is omitted in FIG. 19.

Figure 20:
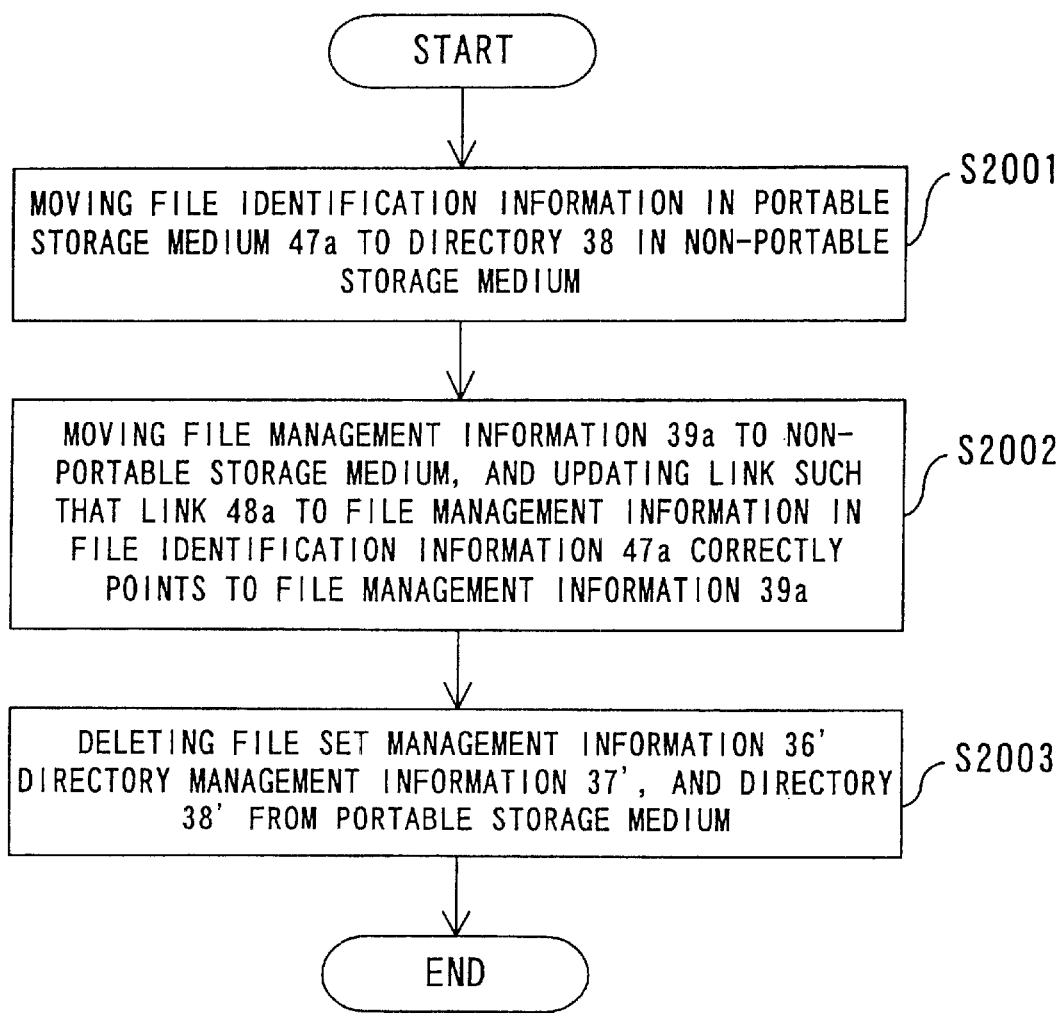
FIG. 20 is a flowchart of the process performed when a portable storage medium is returned to the information processing device according to the second embodiment of the present invention.

FIG. 20 is a flowchart of the process performed when control is returned from the state after the retrieval of the portable storage medium described by referring to FIGS. 17 and 18 to the state shown in FIG. 16, that is, to the state in which the portable storage medium has been inserted. As shown in FIG. 20, when the process starts, the file identification information 47a is moved to the directory 38 in an non-portable storage medium first in step S2001. In step S2002, the file management information 39a is moved to a non-portable storage medium, a link is updated such that the link 48a to the file management information in the file identification information 47a can correctly point to the file management information 39a. In step S2003, the file set management information 36', the directory management information 37', and the directory 38' are deleted from the portable storage medium, thereby terminating the process.

Figure 21:
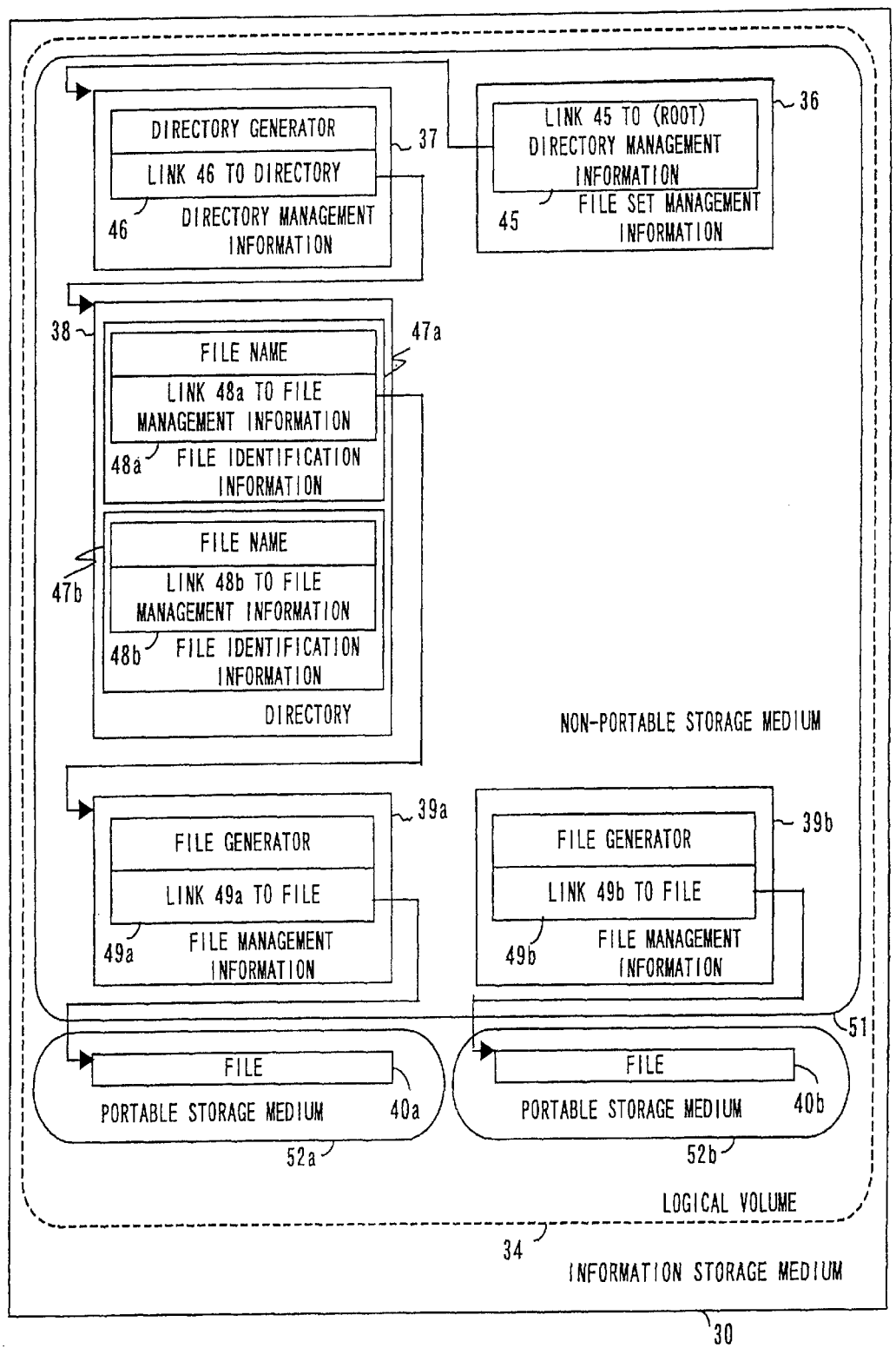
FIG. 21 shows an example of the data structure of a file when there are a plurality of files.

FIG. 21 shows an example of the data structure of a file when there are a plurality of files as in the case shown in FIG. 14. In FIG. 21, the file management information 39a and 39b are respectively pointed to by the links 48a and 48b to the file management information in the plural pieces of file identification information 47a and 47b in the directory 38. Similarly, the files 40a and 40b stored in two portable storage media 52a and 52b are respectively pointed to by the links 49a and 49b.

Figure 22:
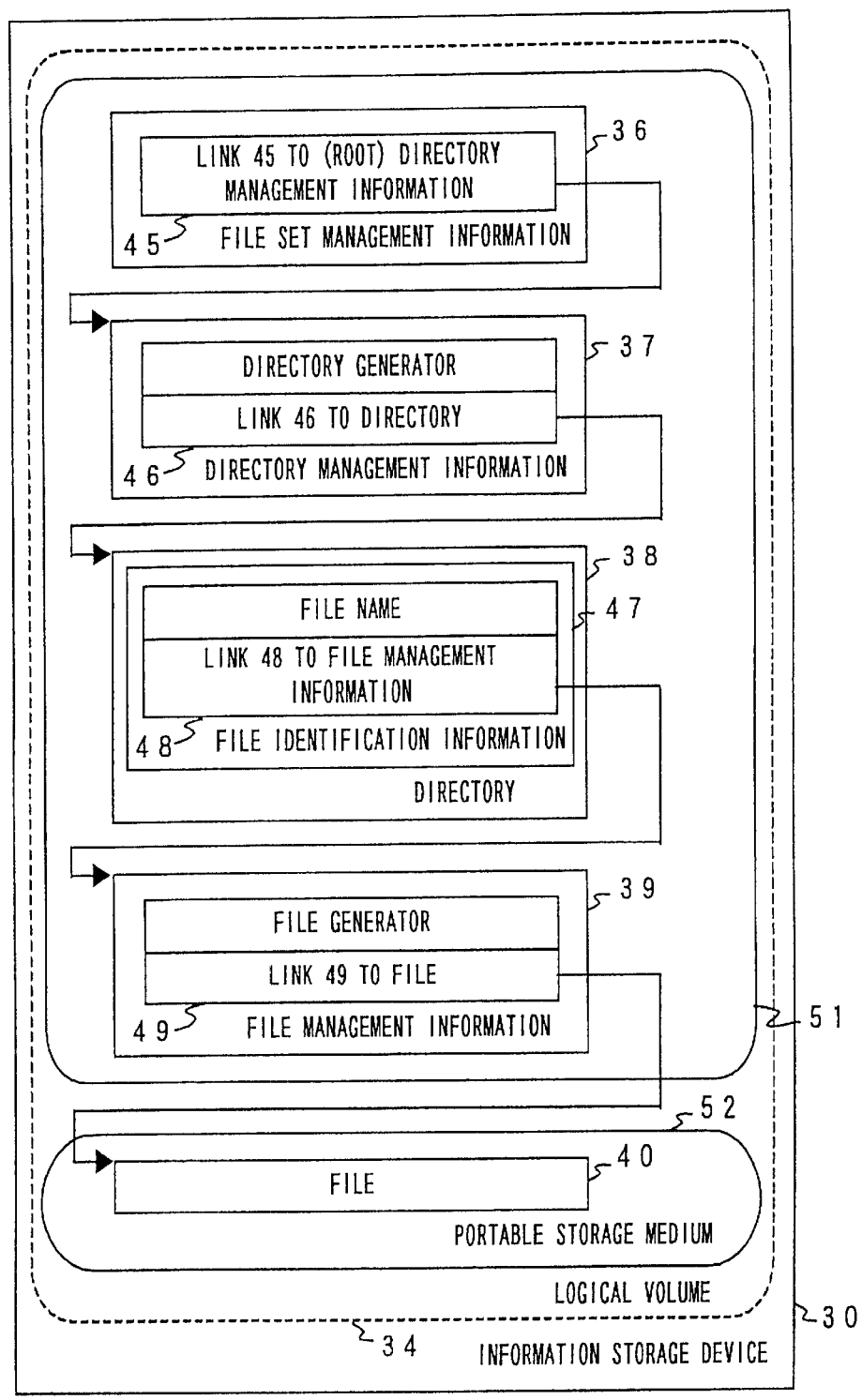
FIG. 22 shows an example of the data structure of a file containing only one piece of file identification information in a directory.

FIG. 22 shows an example of the data structure of a file when a directory stores only one piece of file identification information. In FIG. 22, the file management information 39 is pointed to by the link 48 to the file management information in the file identification information 47 in the directory 38. Similarly, the file 40 stored in the portable storage medium 52 is pointed to by the link 49.

Figure 23:
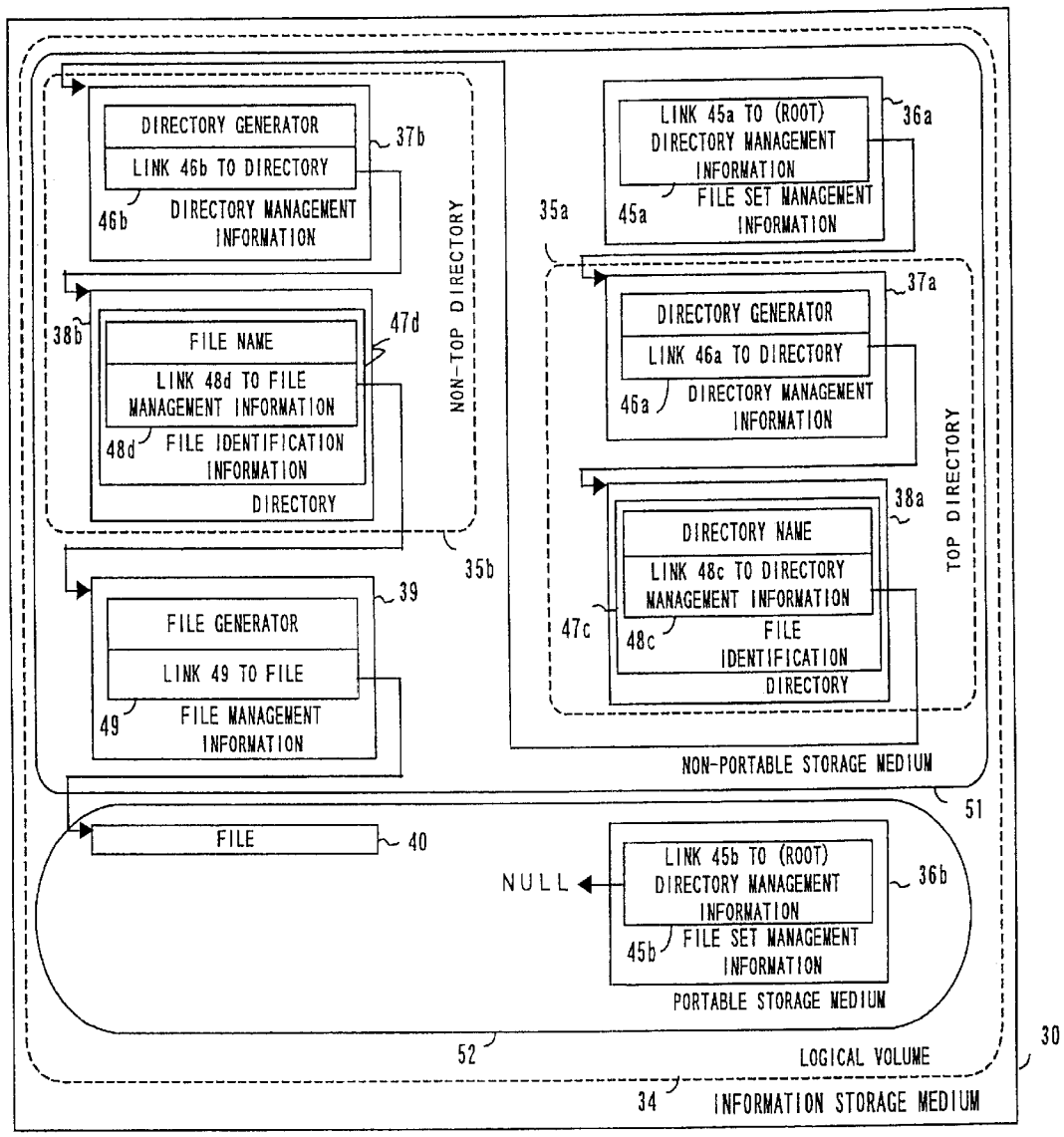
FIG. 23 shows an example of the data structure of a file used when a directory has a hierarchical structure.

FIG. 23 shows an example of the data structure of a file when a directory is hierarchically designed. In FIG. 23, directory management information 37a in a top (root) directory 35a at the highest level in the hierarchical structure is pointed to by a link 45a to the root (top) directory management information in file set management information 36a. A directory 38a is pointed to by a link 46a to the directory in the directory management information 37a. Directory management information 37b in a non-top directory 35b at the second level in the hierarchical structure is pointed to by a link 48c of the directory management information as a part of file identification information 47c in the directory 38a.

Then, a directory 38b is pointed to by a link 46b to the directory in the directory management information 37b. The file management information 39 is pointed to by a link 48d to the file management information in the directory 38b.

In FIG. 23, file set management information 36b is stored in the portable storage medium 52. The link 45a to the root directory management information is stored in the file set management information 36b. However, since there are no directories in the portable storage medium 52, this link points to nothing.

Thus, the file set management information is basically provided for each physical medium. In this example, the file set management information is provided for each of the non-portable storage medium 51, for example a hard disk, and the portable storage medium 52, for example, an MO. However, in this example, since the file set management information 36b in the portable storage medium 52 does not have the function of pointing to a directory, it can be deleted and, as in the cases shown in other figures, the portable storage medium 52 can store only files.

FIG. 24 shows an example of the configuration of duplex data in logical volume units according to the second embodiment of the present invention. In FIG. 24, two logical volume 34a, 34b in an information storage device 42 are associated by the logical volume management information 44a and 44b as in the first embodiment shown in FIG. 11.

FIG. 25 is a flowchart of the process performed when a new file is generated in the duplex data system in logical volume units. In FIG. 25, information from the file set management information in the logical volume 34a and a spare logical volume 34b to the directory is assumed to have been generated.

When the process starts in FIG. 25, the file management information 39a and the file 40a are first stored in a storage medium in step S2501. In step S2502, a link is connected from the directory 38a to the file management information 39a. In step S2503, a logical volume management information 44a is referred to, and a duplexed-to logical volume 34b is specified.

Then, in step S2504, the file management information 39b and the file 40b are stored in a storage medium in the spare logical volume 34b. In step S2505, a link is connected from the directory 38b to the file management information 39b, thereby terminating the process.

Figure 26:
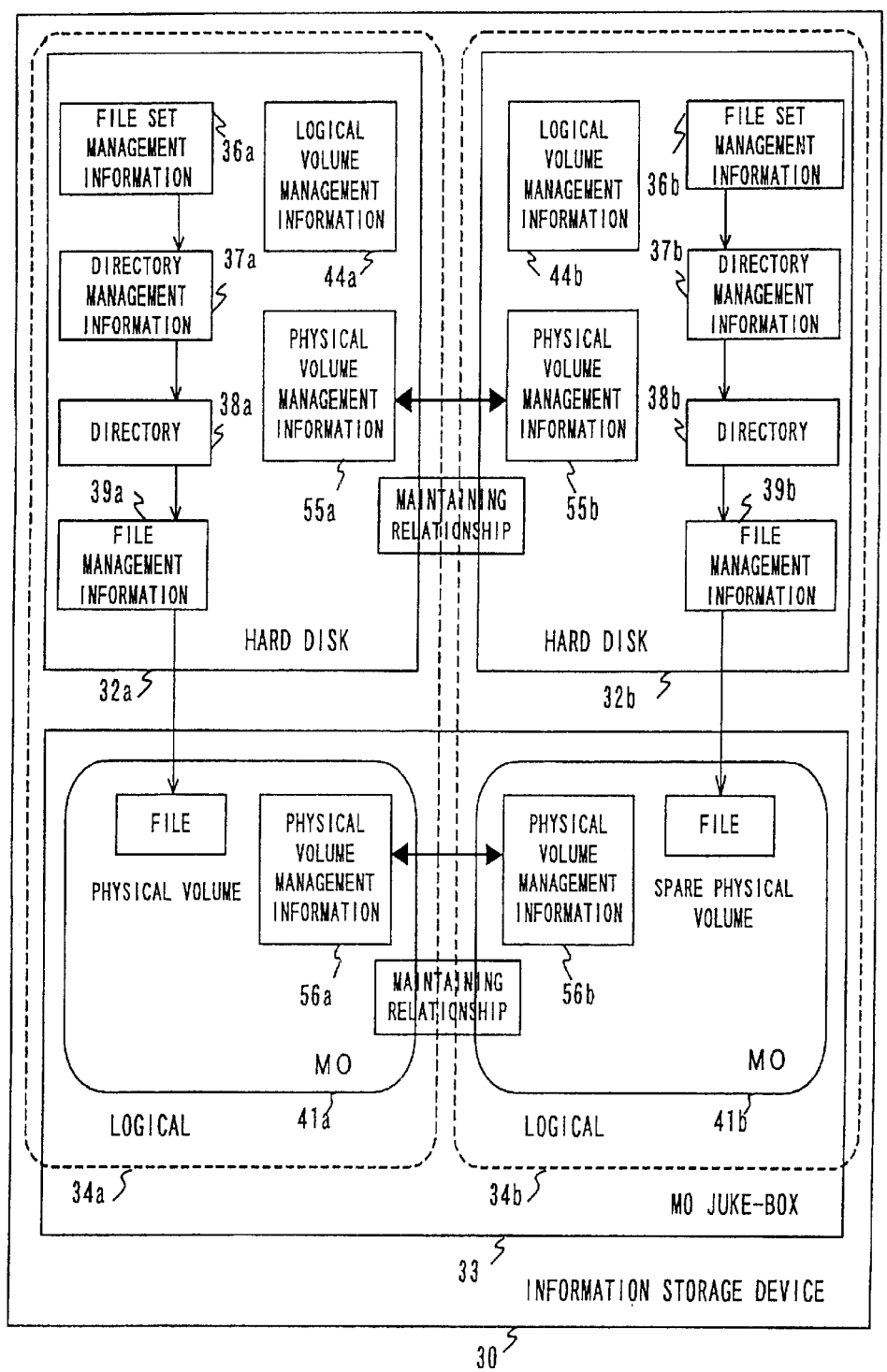
FIG. 26 shows an example of the configuration of duplex data in physical volume units according to the second embodiment of the present invention.

FIG. 26 shows an example of the configuration of duplex data in physical volume units according to the second embodiment of the present invention. In FIG. 26, data is not duplexed in logical volume units as shown in FIG. 24, but is duplexed in physical volume units.

In FIG. 26, the logical volumes 34a and 34b respectively comprise two physical volumes of a hard disk 32a and the MO 41a, and two spare physical volumes of a hard disk 32b and the MO 41b. With the configuration, data is duplexed in physical volume unit between the hard disks 32a and 32b with physical volume management information 55a and 55b associated with each other, and between two MOs 41a and 41b with physical volume management information 56a and 56b associated with each other.

FIGS. 27A and 27B show examples of the data structure of the physical volume management information. FIG. 27A shows the data structure of the duplexed-from physical volume management information, for example, the physical volume management information 55a. The structure comprises a current physical volume ID, and a duplexed-to physical volume ID, that is, the identifier of the hard disk 32b. FIG. 27B shows the data structure of the duplexed-to physical volume information, for example, the physical volume management information 55b. The structure comprises a current physical volume ID and a duplexed-from physical volume ID, that is, the identifier of a hard disk 32a.

To realize an embodiment of the present invention, a program itself for retrieving the portable storage medium from an information processing device as described above by referring to FIG. 19, and for returning it to the information processing device as described above by referring to FIG. 20 can be stored in any distributable portable storage medium, and then loaded to and used in the computer system.

Figure 28:
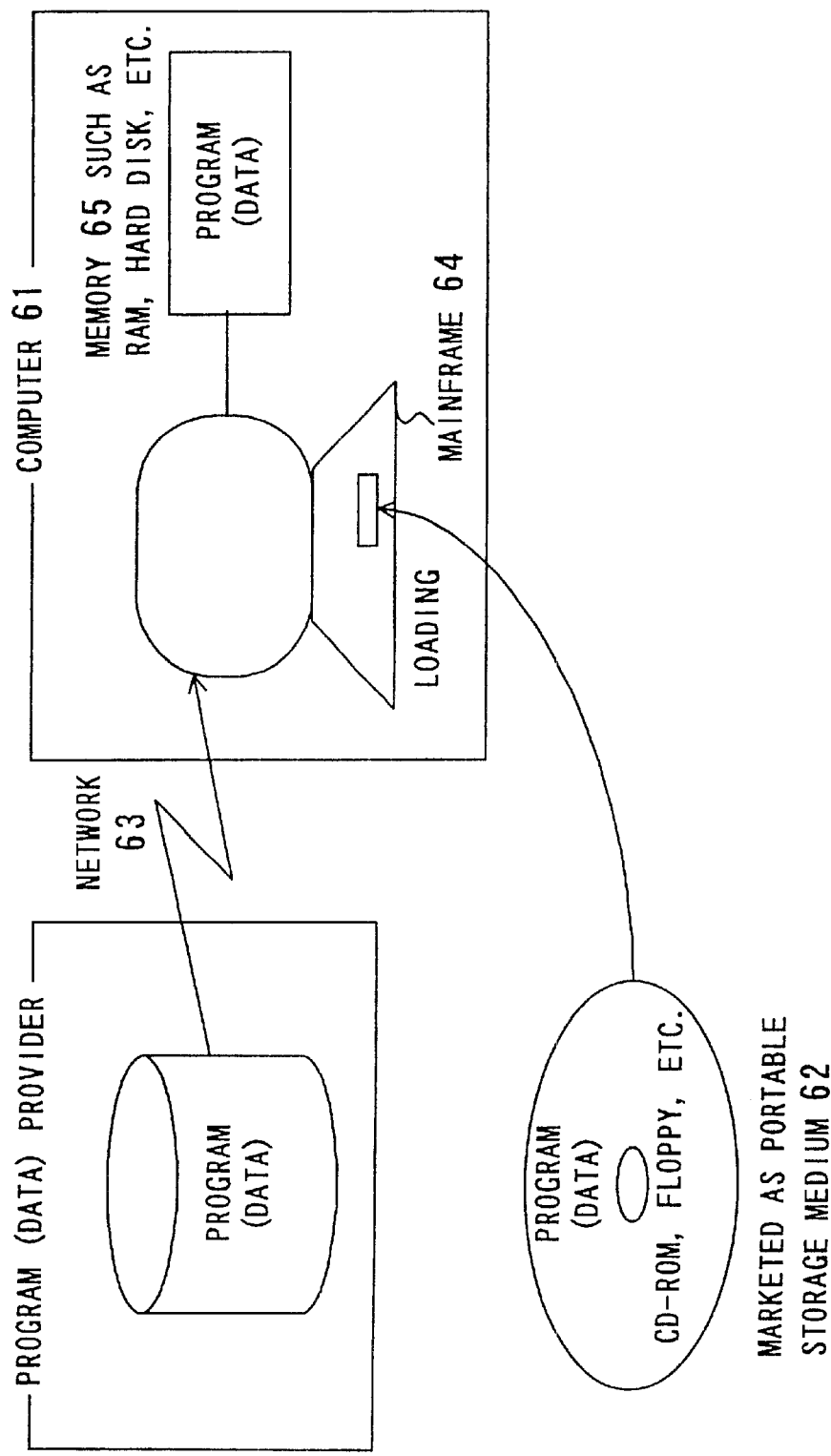
FIG. 28 shows the storage medium storing a program for realizing the present embodiment.

FIG. 28 shows the computer system using a storage medium storing the above described program. In FIG. 28, a computer 61 comprises a mainframe 64 and memory 65, and loads a program from a portable storage medium 62 to the computer 61, or from a program provider to the computer 61 through a network 63.

The programs according to the claims 16 and 17 of the present invention, and the programs shown by the flowcharts shown in FIGS. 5, 6, 13, 19, 20, and 25 are stored in, for example, the memory 65, and the program is executed by the mainframe 64. The memory 65 can be, for example, random access memory (RAM), the above described hard disk, etc.

A program for performing the process when a portable storage medium is retrieved can be stored in the portable storage medium 62, and loaded onto the computer 61 so that the process performed when the portable storage medium is retrieved can be executed. The portable storage medium 62 can be a commonly marketed storage medium such as a memory card, a floppy disk, CD-ROM, an optical disk, a magneto-optical disk, etc. Furthermore, a program for a process performed when a portable storage medium is retrieved can be transmitted from the program provider to the computer 61 through the network 63, and loaded to execute the process performed when the portable storage medium is retrieved.

The embodiments of the present invention have been described above in detail, but the present invention is not limited to the above described applications. For example, it is obvious that the data structure for accessing a file, the number of files, etc. can be arbitrarily set within the scope of the claims of the present invention.

As described above, according to the present invention, in an information processing device in which a plurality of storage media having different accessibility are hierarchically structured, an information storage device can be more efficiently utilized by moving and storing file attribute information required to retrieve a file, etc. and the body of the file to and in a storage media at an appropriate hierarchical level depending on the situation. In addition, data can be duplexed in logical volume units or physical volume units, thereby furthermore improving the reliability of the information storage device.

What is claimed is:

1. A file management apparatus for use in an information processing device having an information storage device in which a plurality of storage media having different accessibility are hierarchically combined, comprising:
   a first control unit allowing a portable storage medium to store a body of a file with data for use in accessing the file, and then allowing the portable storage medium to be ejected from the information storage device;
   a second control unit allowing the portable storage medium to store only the body of the file without storing data for use in accessing the file, and then allowing the portable storage medium to be ejected from the information storage device; and
   a portable storage medium ejection request handling unit allowing either the first control unit or the second control unit to control an external request to retrieve the portable storage medium, wherein
   said plurality of storage media having different accessibility form one logical volume, and also form a spare logical volume storing data in the logical volume as duplex data, and
   said portable storage medium ejection request handling unit also controls a portable storage medium ejection request in the spare logical volume.

2. The apparatus according to claim 1, further comprising:
   a file access data moving unit moving the data for use in accessing the file from the portable storage medium to another storage medium belonging to a different hierarchical level when the portable storage medium storing the data for use in accessing the file is inserted from outside the information storage device to the information storage device.

3. The apparatus according to claim 2, wherein
   said other storage medium belonging to a different hierarchical level cannot be ejected from the information storage device.

4. The apparatus according to claim 1, wherein
   said logical volume and said spare logical volume have logical volume management information for use in recognizing each other's data duplexed-to logical volume.

5. The apparatus according to claim 1, wherein
   each of said logical volume and said spare logical volume has, as data for use in accessing a file, at least file management information pointing to a file to be data-duplexed, and a directory pointing to the file management information.

6. The apparatus according to claim 1, wherein:
   said data for use in accessing a file in the logical volume comprises at least file management information pointing to a file, and a directory pointing to the file management information; and
   said directory points to file management information provided in the spare logical volume corresponding to a spare file as duplex data of the file in the logical volume.

7. The apparatus according to claim 1, wherein:
   said logical volume comprises a plurality of physical volumes, and said spare logical volume comprises a plurality of physical volumes corresponding to the plurality of physical volumes corresponding to the plurality of physical volumes; and
   said plurality of physical volumes forming the logical volume and said plurality of physical volumes forming the spare logical volume contain physical volume management information recognizing a data duplexed-to physical volume of each other.

8. A file management apparatus for use in an information processing device having an information storage device in which a plurality of storage media having different accessibility are hierarchically combined, comprising:
   a first control unit allowing a portable storage medium to store a body of a file with data for use in accessing the file, and then allowing the portable storage medium to be ejected from the information storage device;
   a second control unit allowing the portable storage medium to store only the body of the file without storing data for use in accessing the file, and then allowing the portable storage medium to be ejected from the information storage device; and
   a portable storage medium ejection request handling unit allowing either the first control unit or the second control unit to control an external request to retrieve the portable storage medium, wherein:
   said plurality of storage media having different accessibility forms one logical volume,
   said apparatus further comprises, in another information processing device connected to said information processing device through a network, a spare logical volume storing data as duplexed data from the logical volume, and
   said portable storage medium ejection request handling unit also controls a portable storage medium ejection request in the spare logical volume.

9. The apparatus according to claim 8, wherein
said logical volume and said spare logical volume comprise logical volume management information recognizing a data duplexed-to logical volume of each other.

10. The apparatus according to claim 8, wherein
said logical volume and said spare logical volume comprise file management information pointing to at least a file to be data-duplexed and a directory pointing to the file management information as data for use in accessing a file.

11. The apparatus according to claim 8, wherein:
said data for use in accessing a file in the logical volume comprises at least file management information pointing to a file, and a directory pointing to the file management information; and
said directory points to file management information provided in the spare logical volume corresponding to a spare file as duplex data of the file in the logical volume.

12. The apparatus according to claim 8, wherein:
said logical volume comprises a plurality of physical volumes, and said spare logical volume comprises a plurality of physical volumes corresponding to the plurality of physical volume; and
said plurality of physical volumes forming the logical volume and said plurality of physical volumes forming the spare logical volume contain physical volume management information recognizing a data duplexed-to physical volume of each other.

13. A file managing method for use in an information storage device in which a plurality of storage media having different accessibility are hierarchically combined, comprising:
in response to an external ejection request to a portable storage medium set in the information storage device storing only a body of a file, determining whether or not data for use in accessing the file can be moved to the portable storage medium;
allowing the portable storage medium to be immediately ejected when the data cannot be moved; and
when the data can be moved, moving the data for access to the portable storage medium, and then allowing the portable storage medium to be ejected, wherein:
said plurality of storage media having different accessibility form one logical volume, and also form a spare logical volume storing data in the logical volume as duplex data, and
said portable storage medium ejection request handling unit also controls a portable storage medium ejection request in the spare logical volume.

14. The method according to claim 13, wherein
said data for use in accessing the file is moved from the portable storage medium to another storage medium belonging to a different hierarchical level when the portable storage medium storing the data for use in accessing the file is inserted from outside the information storage device to the information storage device.

15. A computer-readable storage medium used in a computer having an information storage device in which a plurality of storage media having different accessibility are hierarchically combined, said storage medium controlling the computer and comprising a process of:
in response to an external ejection request to a portable storage medium set in the information storage device storing only a body of a file, determining whether or not data for use in accessing the file can be moved to the portable storage medium;
allowing the portable storage medium to be immediately ejected when a result of said determining indicates that the data cannot be moved; and
when a result of said determining indicates that the data can be moved, moving the data for access to the portable storage medium, and then allowing the portable storage medium to be ejected, wherein:
said plurality of storage media having different accessibility form one logical volume, and also form a spare logical volume storing data in the logical volume as duplex data, and
said portable storage medium ejection request handling unit also controls a portable storage medium ejection request in the spare logical volume.

16. The storage medium according to claim 15, further comprising
moving the data for use in accessing the file from the portable storage medium to another storage medium belonging to a different hierarchical level when the portable storage medium storing the data for use in accessing the file is inserted from outside the information storage device to the information storage device.

17. A file management apparatus used for an information storage device having a plurality of storage media, comprising:
a first control unit moving data used to access a file to a portable storage medium containing a body of the file, and ejecting the portable storage medium from the information storage device;
a second control unit ejecting the portable storage medium containing the body of the file from the information storage device, without moving the data used to access the file to the portable storage medium; and
a portable storage medium ejection request handling unit directing, in response to a user request to remove the portable storage medium from the information storage device, the first control unit to control ejection if the data used to access the file is authorized to be moved to the portable storage medium, or directing the second control unit to control ejection if the data is not authorized to be moved, wherein:
said plurality of storage media form one logical volume, and also form a spare logical volume storing data in the logical volume as duplex data, and
said portable storage medium ejection request handling unit also controls a portable storage medium ejection request in the spare logical volume.

* * * * *

UNITED STATES PATENT AND TRADEMARK OFFICE
CERTIFICATE OF CORRECTION

PATENT NO.    : 6,505,213 B1
DATED         : January 7, 2003
INVENTOR(S)   : Jun Kamada et al.

It is certified that error appears in the above-identified patent and that said Letters Patent is hereby corrected as shown below:

<u>Column 12,</u>
Lines 34-35, delete "corresponding to the plurality of physical volumes"

Signed and Sealed this

Twenty-seventh Day of May, 2003

JAMES E. ROGAN
*Director of the United States Patent and Trademark Office*